US011549305B2

(12) United States Patent
Ishibashi et al.

(10) Patent No.: US 11,549,305 B2
(45) Date of Patent: Jan. 10, 2023

(54) GLASS PANEL UNIT ASSEMBLY, AND METHOD FOR MANUFACTURING GLASS PANEL UNIT

(71) Applicant: Panasonic Intellectual Property Management Co., Ltd., Osaka (JP)

(72) Inventors: Tasuku Ishibashi, Ishikawa (JP); Eiichi Uriu, Osaka (JP); Kazuya Hasegawa, Osaka (JP); Hiroyuki Abe, Osaka (JP); Masataka Nonaka, Osaka (JP); Takeshi Shimizu, Osaka (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

(21) Appl. No.: 17/044,131

(22) PCT Filed: Apr. 19, 2019

(86) PCT No.: PCT/JP2019/016787
§ 371 (c)(1),
(2) Date: Sep. 30, 2020

(87) PCT Pub. No.: WO2019/230247
PCT Pub. Date: Dec. 5, 2019

(65) Prior Publication Data
US 2021/0123295 A1    Apr. 29, 2021

(30) Foreign Application Priority Data
May 31, 2018   (JP) .............................. JP2018-105532

(51) Int. Cl.
*E06B 3/677*     (2006.01)
*C03C 27/06*     (2006.01)
(Continued)

(52) U.S. Cl.
CPC .............. *E06B 3/677* (2013.01); *C03C 27/06* (2013.01); *E06B 3/6612* (2013.01); *E06B 3/66304* (2013.01)

(58) Field of Classification Search
CPC .... E06B 3/677; E06B 3/6612; E06B 3/66304; E06B 3/66323; E06B 3/6675; C03C 27/06
See application file for complete search history.

(56) References Cited

U.S. PATENT DOCUMENTS

2015/0068665 A1    3/2015  Abe et al.
2017/0292892 A1 * 10/2017 Ishibashi .................. G01N 7/04
(Continued)

FOREIGN PATENT DOCUMENTS

JP     2017-160121 A    9/2017
WO    WO-2013172033 A1 * 11/2013 ............. B32B 17/00
(Continued)

OTHER PUBLICATIONS

International Search Report and Written Opinion dated Jun. 20, 2019 in International Application No. PCT/JP2019/016787.

*Primary Examiner* — Theodore V Adamos
(74) *Attorney, Agent, or Firm* — McDermott Will & Emery LLP

(57) ABSTRACT

An assembly includes a plurality of partitions to partition an internal space, surrounded with a pair of glass substrates arranged to face each other and a the peripheral wall having a frame shape and provided between the pair of glass substrates, into an evacuation space and a ventilation space. The plurality of partitions includes a first partition and a second partition, of which lengths are defined in two different directions. An end of the second partition faces a side portion of the first partition with a predetermined gap left between them. A space between the end of the second partition and the side portion of the first partition constitutes (Continued)

an air passage to evacuate the evacuation space through an evacuation port. The second partition includes, at the end thereof, a swollen portion protruding toward the evacuation space at least along the width of the second partition.

9 Claims, 33 Drawing Sheets

(51) Int. Cl.
*E06B 3/66* (2006.01)
*E06B 3/663* (2006.01)

(56) References Cited

U.S. PATENT DOCUMENTS

| | | | | |
|---|---|---|---|---|
| 2017/0298681 | A1* | 10/2017 | Abe | ............... E06B 3/67365 |
| 2018/0038152 | A1* | 2/2018 | Nonaka | ............... B28D 1/24 |
| 2018/0179806 | A1 | 6/2018 | Abe et al. | |
| 2019/0055775 | A1 | 2/2019 | Abe et al. | |
| 2019/0055776 | A1* | 2/2019 | Uriu | ............... B32B 17/10 |
| 2019/0136608 | A1 | 5/2019 | Abe et al. | |
| 2020/0109594 | A1 | 4/2020 | Abe et al. | |

FOREIGN PATENT DOCUMENTS

| | | | | |
|---|---|---|---|---|
| WO | WO-2013172034 A1 * | 11/2013 | ............. | C03C 27/06 |
| WO | WO-2016051787 A1 * | 4/2016 | ............. | C03C 27/10 |
| WO | 2016/143328 A1 | 9/2016 | | |
| WO | 2017/056421 A1 | 4/2017 | | |
| WO | WO-2017056418 A1 * | 4/2017 | ........... | B32B 17/064 |
| WO | 2017/169731 A1 | 10/2017 | | |

* cited by examiner

GLASS PANEL UNIT ASSEMBLY, AND METHOD FOR MANUFACTURING GLASS PANEL UNIT

CROSS REFERENCE TO RELATED APPLICATIONS

This application is the U.S. National Phase under 35 U.S.C. § 371 of International Application No. PCT/JP2019/016787, filed on Apr. 19, 2019, which in turn claims the benefit of Japanese Application No. 2018-105532, filed on May 31, 2018, the entire contents of each are hereby incorporated by reference.

TECHNICAL FIELD

The present disclosure generally relates to a glass panel unit assembly and a method for manufacturing a glass panel unit. More particularly, the present disclosure relates to an assembly of thermally insulating glass panel units each having a space between a pair of glass panels and a method for manufacturing such a glass panel unit.

BACKGROUND ART

Patent Literature 1 discloses a method for manufacturing a glass panel unit. According to the method for manufacturing a glass panel unit as taught in Patent Literature 1, an internal space surrounded with a frame member is created between a first glass substrate and a second glass substrate which are bonded together. The internal space is partitioned by a partitioning member into a first space and a second space. The air in the first space is exhausted to an external environment through an air passage, the second space, and a ventilation port to evacuate the first space to a vacuum. Thereafter, the partitioning member is melted by heating to be deformed to close the air passage. In this manner, a provisionally assembled unit with the first space that has turned into a vacuum space (i.e., a glass panel unit assembly) is obtained. Subsequently, the provisionally assembled unit is cut off and physically separated into a part having the first space and a part having the second space. The part having the first space is used as a glass panel unit.

According to Patent Literature 1, the partitioning member is melted by heating and deformed to close the air passage. However, the partitioning member tends to be thinner at its part closing the air passage. This would cause a decline in the strength of the partitioning member and eventually cause a decline in production yield.

CITATION LIST

Patent Literature

Patent Literature 1: WO 2016/143328 A1

SUMMARY OF INVENTION

The problem to overcome is to provide a glass panel unit assembly and a method for manufacturing a glass panel unit, both of which contribute to increasing the production yield of glass panel units.

A glass panel unit assembly according to an aspect of the present disclosure includes: a pair of glass substrates arranged to face each other; a frame-shaped peripheral wall disposed between the pair of glass substrates; and a plurality of partitions to partition an internal space, surrounded with the pair of glass substrates and the peripheral wall, into an evacuation space and a ventilation space. The assembly further includes: an evacuation port connecting the ventilation space to an external environment; and an air passage to evacuate the evacuation space through the evacuation port. The plurality of partitions includes a first partition and a second partition, of which lengths are defined in two different directions. An end of the second partition faces a side portion of the first partition with a predetermined gap left between the first partition and the second partition. The air passage is a space between the end of the second partition and the side portion of the first partition. The second partition includes, at the end thereof, a swollen portion protruding toward the evacuation space at least along width of the second partition.

A glass panel unit assembly according to another aspect of the present disclosure includes: a pair of glass substrates arranged to face each other; a frame-shaped peripheral wall disposed between the pair of glass substrates; and a plurality of partitions to partition an internal space, surrounded with the pair of glass substrates and the peripheral wall, into an evacuation space and a ventilation space. The assembly further includes: an evacuation port connecting the ventilation space to an external environment; and an air passage to evacuate the evacuation space through the evacuation port. The plurality of partitions includes a first partition and a second partition, of which lengths are defined in two different directions. An end of the second partition faces a side portion of the first partition with a predetermined gap left between the first partition and the second partition. The air passage is a space between the end of the second partition and the side portion of the first partition. The first partition has one or more protrusions protruding from the side portion of the first partition toward the end of the second partition. At least one of the one or more protrusions faces the end of the second partition and is located closer to the evacuation space than the second partition is.

A method for manufacturing a glass panel unit according to still another aspect of the present disclosure includes an assembling step, an evacuation step, and a sealing step. The assembling step includes providing the glass panel unit assembly described above. The evacuation step includes evacuating the evacuation space through the air passage, the ventilation space, and the evacuation port. The sealing step includes deforming the plurality of partitions to close the air passage.

A glass panel unit assembly according to yet another aspect of the present disclosure includes: a pair of glass substrates arranged to face each other; a frame-shaped peripheral wall disposed between the pair of glass substrates; and a partition to partition an internal space, surrounded with the pair of glass substrates and the peripheral wall, into an evacuation space and a ventilation space. The assembly further includes: an evacuation port connecting the ventilation space to an external environment; and an air passage to evacuate the evacuation space through the evacuation port. An end of the partition faces the peripheral wall with a predetermined gap left between the partition and the peripheral wall. The air passage is a space between the end of the partition and the peripheral wall. The partition includes, at the end thereof, a swollen portion protruding toward the evacuation space at least along width of the partition.

A glass panel unit assembly according to yet another aspect of the present disclosure includes: a pair of glass substrates arranged to face each other; a frame-shaped peripheral wall disposed between the pair of glass substrates; and a partition to partition an internal space, surrounded with the pair of glass substrates and the peripheral wall, into an evacuation space and a ventilation space. The assembly further includes: an evacuation port connecting the ventilation space to an external environment; and an air passage to evacuate the evacuation space through the evacuation port. An end of the partition faces the peripheral wall with a predetermined gap left between the partition and the peripheral wall. The air passage is a space between the end of the partition and the peripheral wall. The peripheral wall has one or more protrusions protruding toward the end of the partition. At least one of the one or more protrusions faces the end of the partition and is located closer to the evacuation space than the partition is.

DESCRIPTION OF EMBODIMENTS

1. Embodiments 1.1. Overview

Figure 1:
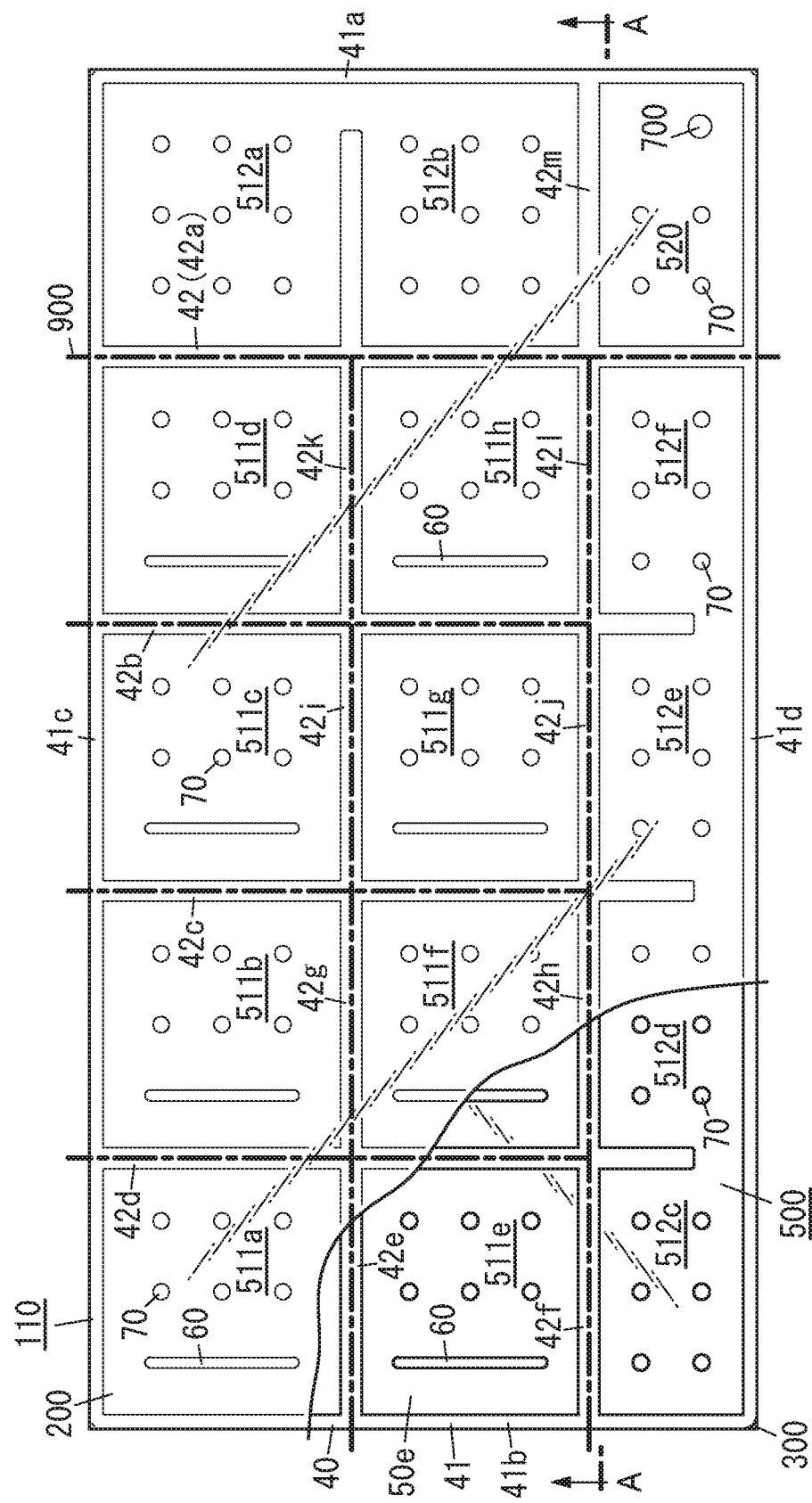
FIG. 1 is a plan view of a work in progress of a glass panel unit according to an exemplary embodiment.
Figure 2:
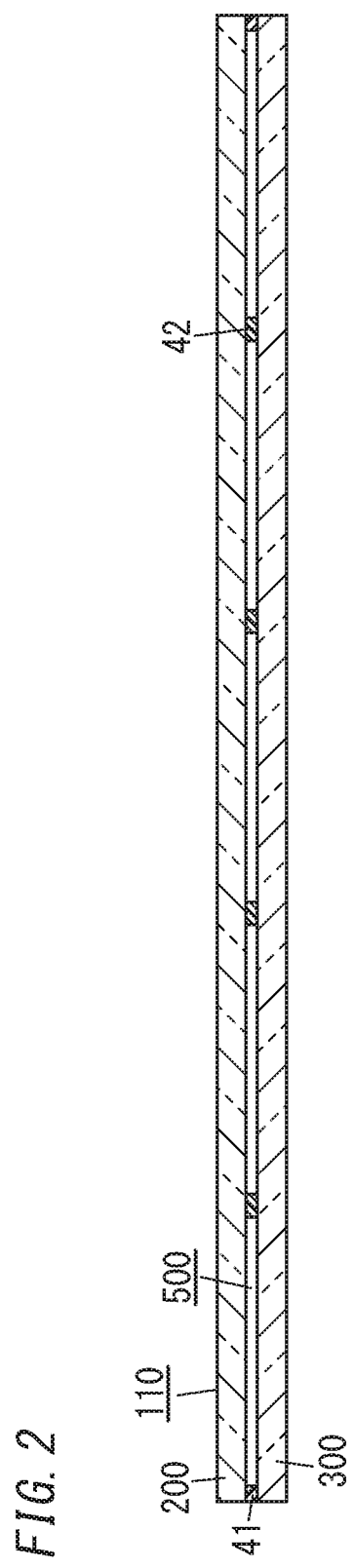
FIG. 2 is a cross-sectional view thereof taken along the plane A-A shown in FIG. 1.

FIGS. 1 and 2 illustrate a work in progress 110 of a glass panel unit according to an exemplary embodiment. The work in progress 110 of a glass panel unit is used to manufacture one or more glass panel units (e.g., the glass panel units 10A-10H shown in FIG. 23 in this embodiment).

Figure 3:
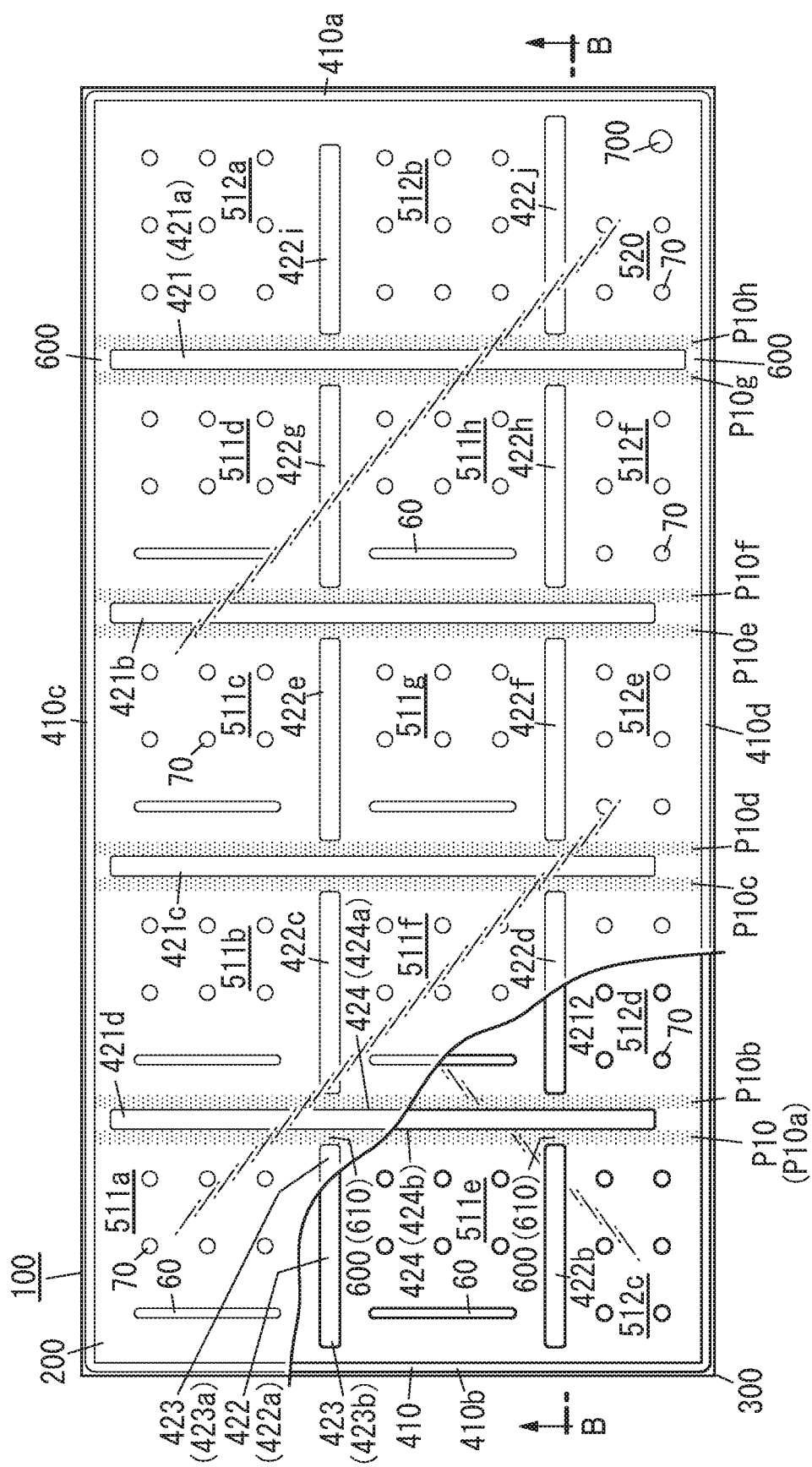
FIG. 3 is a plan view of a glass panel unit assembly according to the exemplary embodiment.
Figure 4:
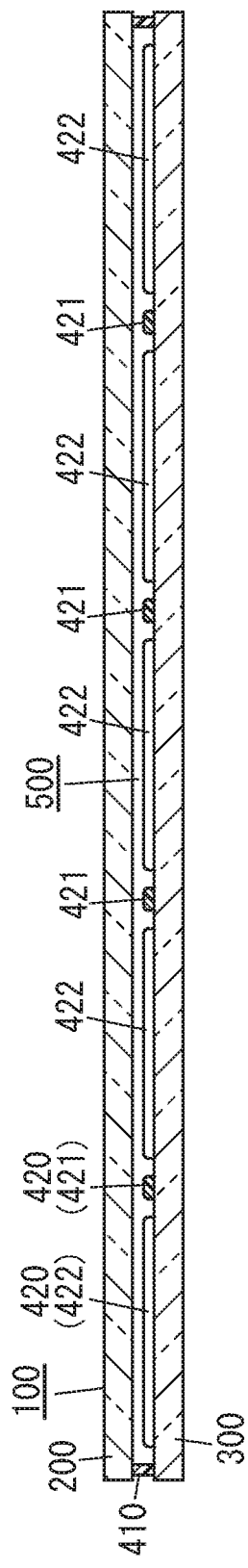
FIG. 4 is a cross-sectional view thereof taken along the plane B-B shown in FIG. 3.
Figure 12:
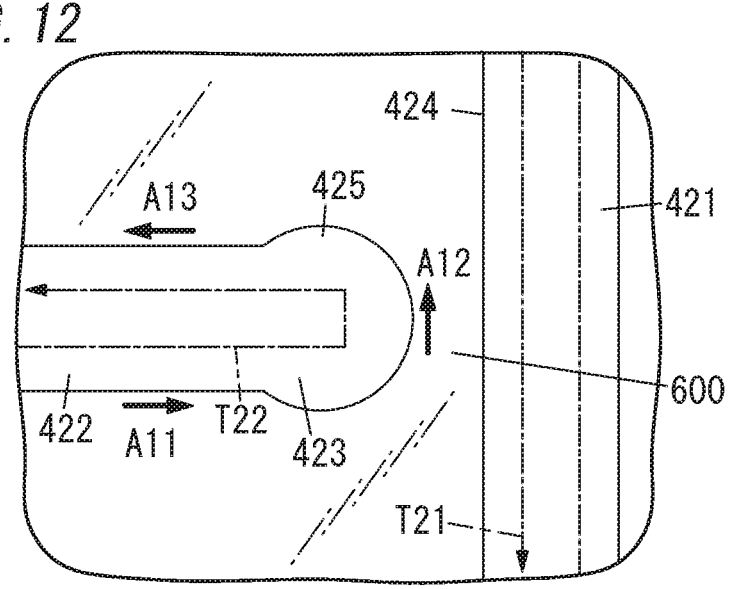
FIG. 12 illustrates how to perform the preparatory step (assembling step) in the manufacturing method.

The work in progress 110 is formed during the process of manufacturing the glass panel units 10 (10A-10H) out of the assembly 100 shown in FIGS. 3 and 4. The assembly 100 includes: a pair of glass substrates 200, 300 arranged to face each other; a frame-shaped peripheral wall 410 disposed between the pair of glass substrates 200, 300; a plurality of partitions 420; an evacuation port 700; and an air passage 600. The plurality of partitions 420 partitions an internal space 500, surrounded with the pair of glass substrates 200, 300 and the peripheral wall 410, into an evacuation space 511 and a ventilation space 520. The evacuation port 700 connects the ventilation space 520 to an external environment. The air passage 600 is used to evacuate the evacuation space 511 through the evacuation port 700. The plurality of partitions 420 includes a first partition 421 and a second partition 422, of which lengths are defined in two different directions as shown in FIG. 12. An end 423 of the second partition 422 faces a side portion 424 of the first partition 421 with a predetermined gap left between the first partition 421 and the second partition 422. The air passage 600 is a space between the end 423 of the second partition 422 and the side portion 424 of the first partition 421. The second partition 422 includes, at the end 423 thereof, a swollen portion 425 protruding toward the evacuation space 511 at least along width of the second partition 422.

In this assembly 100, the second partition 422 includes, at the end 423 thereof, a swollen portion 425 protruding toward the evacuation space 511 along the width of the second partition 422 (i.e., in the upward/downward direction in FIG. 12) as shown in FIG. 12. This swollen portion 425 reduces the chances of the partition 420 coming to have a depression and becoming too thin in the region where the partition 420 (boundary wall 42) closes the air passage 600. This curbs a decline in the strength of the partition 420 (boundary wall 42) and contributes to increasing the production yield.

1.2. Configuration

Figure 23:
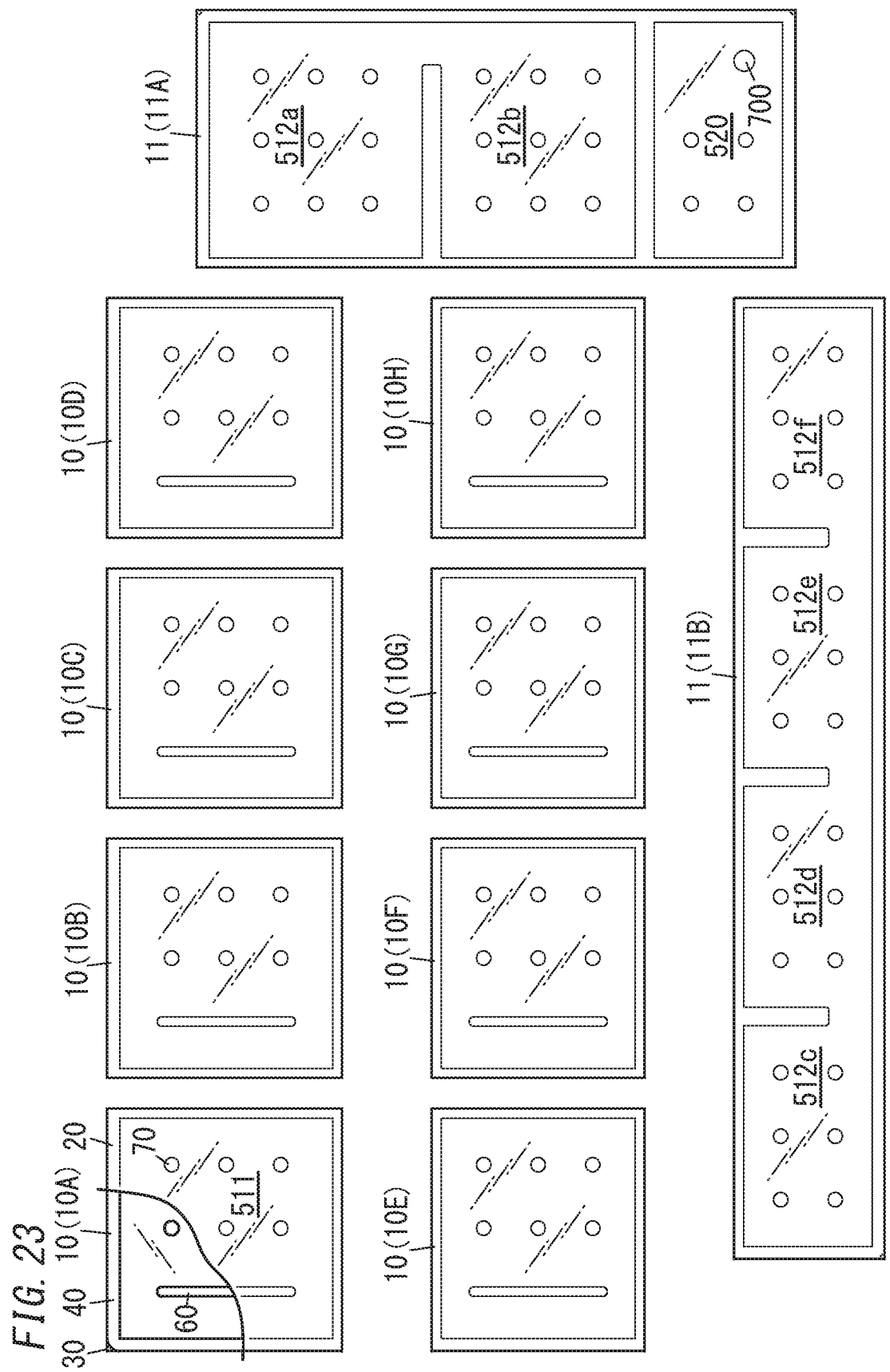
FIG. 23 illustrates how to perform a removing step in the manufacturing method.

Next, glass panel units 10 (10A-10H), a glass panel unit assembly 100, and a work in progress 110 of glass panel units will be described in detail. The assembly 100 is used to manufacture a plurality of (e.g., eight in this example) glass panel units 10 (10A-10H) as shown in FIG. 23. The work in progress 110 is formed during the process of manufacturing the glass panel units 10 (10A-10H) out of the assembly 100. In the following description, the glass panel unit assembly 100 will be hereinafter simply referred to as an "assembly" and the work in progress 110 of glass panel units will be hereinafter simply referred to as a "work in progress" as needed.

1.2.1. Glass Panel Unit

First, the glass panel units 10 (10A-10H) will be described. The glass panel units 10 (10A-10H) are vacuum insulated glazing units. The vacuum insulated glazing unit is a type of multi-pane glazing unit (or multi-pane glass panel unit) including at least one pair of glass panels and has a vacuum space between the pair of glass panels. Each of the glass panel units 10A-10H includes a pair of glass panels (first and second glass panels) 20, 30, and a frame member 40 as shown in FIG. 23. In addition, each of the glass panel units 10A-10H further includes a space (evacuation space) 511 (511a-511h (see FIG. 1)) surrounded with the pair of glass panels 20, 30 and the frame member 40. Each of the glass panel units 10A-10H further includes, within the evacuation space 511, a gas adsorbent 60 and a plurality of pillars (spacers) 70. The glass panel units 10A-10H each have a quadrangular shape in a plan view and have the same dimensions and the same shape.

The pair of glass panels 20, 30 have the same shape, and may be each formed in a rectangular flat plate shape. Examples of materials for the pair of glass panels 20, 30 include soda lime glass, high strain point glass, chemically tempered glass, alkali-free glass, quartz glass, Neoceram, and thermally tempered glass. The surface of the pair of glass panels 20, 30 may be covered with a coating. The coating may be a transparent infrared reflective film, for example. However, this is only an example and should not be construed as limiting. The coating does not have to be an infrared reflective film but may also be any other film with desired physical properties.

The frame member 40 is arranged between the pair of glass panels 20, 30 to hermetically bond the pair of glass panels 20, 30 together. This allows an evacuation space 511, surrounded with the pair of glass panels 20, 30 and the frame member 40, to be created. In addition, the evacuation space 511 surrounded with the pair of glass panels 20, 30 and the frame member 40 is in a vacuum condition. In other words, the evacuation space 511 has an internal pressure lower than the atmospheric pressure. The frame member 40 may be made of a hot glue as a sealant. In other words, the frame member 40 is a cured hot glue. The hot glue may be a glass frit, for example. The glass frit may be a low-melting glass frit, for example. Examples of the low-melting glass frits include a bismuth-based glass frit, a lead-based glass frit, and a vanadium-based glass frit. The frame member 40, as well as the pair of glass panels 20, 30, has a polygonal shape (e.g., a quadrangular shape in this embodiment). The frame member 40 is formed along the respective outer peripheries of the pair of glass panels 20, 30. The hot glue does not have to be a glass frit but may also be a low-melting metal or a hot-melt adhesive, for example.

The gas adsorbent 60 is placed in the evacuation space 511. Specifically, the gas adsorbent 60 has an elongate flat-plate shape and is placed on the glass panel 30. The gas adsorbent 60 is used to adsorb an unnecessary gas (such as a residual gas). The unnecessary gas is a gas emitted from the hot glue forming the frame member 40 when the hot glue is heated, for example. The gas adsorbent 60 includes a getter. The getter is a material having the property of adsorbing molecules smaller in size than a predetermined one. The getter may be an evaporative getter, for example. The evaporative getter has the property of releasing adsorbed molecules when heated to a predetermined temperature (activation temperature) or more. This allows, even if the adsorption ability of the evaporative getter deteriorates, the evaporative getter to recover its adsorption ability by being heated to the activation temperature or more. The evaporative getter may be a zeolite or an ion-exchanged zeolite (such as a copper ion exchanged zeolite). The gas adsorbent 60 includes a powder of this getter. Specifically, the gas adsorbent 60 may be formed by applying a liquid including a powder of the getter (such as a dispersion liquid obtained by dispersing a powder of the getter in a liquid or a solution obtained by dissolving a powder of the getter in a liquid) and solidifying the liquid. This reduces the size of the gas adsorbent 60, thus allowing the gas adsorbent 60 to be placed even when the evacuation space 511 is narrow.

The plurality of pillars 70 are arranged in the evacuation space 511. The plurality of pillars 70 is used to maintain a predetermined gap between the pair of glass panels 20, 30. That is to say, the plurality of pillars 70 is used to maintain the gap distance between the pair of glass panels 20, 30 at a predetermined value. Note that the dimensions, number, spacing, and arrangement pattern of the pillars 70 may be selected appropriately. Each of the pillars 70 has the shape of a circular column, of which the height is approximately equal to the predetermined gap. For example, the pillars 70 may have a diameter of 1 mm and a height of 100 μm. Optionally, the pillars 70 may also have any other desired shape such as a prismatic or spherical shape.

1.2.2. Glass Panel Unit Assembly

Next, the glass panel unit assembly 100 will be described. As shown in FIGS. 3 and 4, the assembly 100 includes: a pair of (first and second) glass substrates 200, 300 arranged to face each other; a peripheral wall 410; first partitions 421a-421d and second partitions 422a-422j; a plurality of air passages 600; and an evacuation port 700. The assembly 100 further includes a plurality of gas adsorbents 60 and a plurality of pillars (spacers) 70. In the following description, when there is no need to distinguish the first partitions 421a-421d from each other, the first partitions 421a-421d will be hereinafter collectively referred to as "first partitions 421." Likewise, when there is no need to distinguish the second partitions 422a-422j from each other, the second partitions 422a-422j will be hereinafter collectively referred to as "second partitions 422." Furthermore, when there is no need to distinguish the first partitions 421 and the second partitions 422 from each other, the first partitions 421 and the second partitions 422 will be hereinafter collectively referred to as "partitions 420."

The first glass substrate 200 is a member that forms the basis of the first glass panel 20 and is made of the same material as the first glass panel 20. The second glass substrate 300 is a member that forms the basis of the second glass panel 30 and is made of the same material as the second glass panel 30. The first and second glass substrates 200, 300 have the same shape and each have a polygonal plate shape (e.g., a rectangular plate shape in this embodiment). In this embodiment, the first glass substrate 200 has dimensions that are large enough to form the respective first glass panels 20 of the glass panel units 10A-10H, and the second glass substrate 300 has dimensions that are large enough to form the respective second glass panels 30 of the glass panel units 10A-10H.

The peripheral wall 410 is made of a sealant (first sealant). The first sealant includes a hot glue, for example. The hot glue may be a glass frit, for example. The glass frit may be a low-melting glass frit, for example. Examples of the low-melting glass frits include a bismuth-based glass frit, a lead-based glass frit, and a vanadium-based glass frit. The first sealant further includes a core material. The core material is used to define the height of the frame member 40. The core material may be spherical glass beads, for example. The diameter of the glass beads may be selected according to the height of the frame member 40. Such a core material is dispersed at a predetermined ratio in the hot glue. For example, glass beads with a diameter of 50 µm to 300 µm are included to account for 0.01 wt % to 1 wt % (0.03% to 3% by volume) of the hot glue. Such a first sealant is a porous one and keeps ventilation ability before melted but loses its ventilation ability once melted.

The peripheral wall 410 is located between the pair of glass substrates 200, 300. The peripheral wall 410 has a frame shape as shown in FIG. 3. In particular, the peripheral wall 410 may have a rectangular frame shape. The peripheral wall 410 is formed along the respective outer peripheries of the first and second glass substrates 200, 300. The peripheral wall 410 has first to fourth sides 410a-410d. The first and second sides 410a, 410b extend along the width of the first and second glass substrates 200, 300 (i.e., in the upward/downward direction in FIG. 3). The third and fourth sides 410c, 410d extend along the length of the first and second glass substrates 200, 300 (i.e., in the rightward/leftward direction in FIG. 3). The peripheral wall 410 is provided to hermetically bond the first and second glass substrates 200, 300 together. Thus, in the assembly 100, an internal space 500 is formed to be surrounded with the peripheral wall 410, the first glass substrate 200, and the second glass substrate 300.

Each of the plurality of partitions 420 is made of a sealant (second sealant). The second sealant includes a hot glue, for example. The hot glue may be a glass frit, for example. The glass frit may be a low-melting glass frit, for example. Examples of the low-melting glass frits include a bismuth-based glass frit, a lead-based glass frit, and a vanadium-based glass frit. In this embodiment, the hot glue of the partitions 420 is the same as that of the peripheral wall 410. Therefore, the partitions 420 and the peripheral wall 410 have the same softening point. In addition, the second sealant includes the same core material as the first sealant. In the second sealant, the core material is also dispersed at a predetermined ratio in the hot glue. For example, glass beads with a diameter of 50 µm to 300 µm are included to account for 0.01 wt % to 1 wt % (0.03% to 3% by volume) of the hot glue. Such a second sealant, as well as the first sealant, is a porous one and keeps ventilation ability before melted but loses its ventilation ability once melted.

The plurality of partitions 420 partitions the internal space 500 surrounded with the pair of glass substrates 200, 300 and the peripheral wall 410 into the evacuation spaces 511 (511a-511h), buffer spaces 512 (512a-512f), and the ventilation space 520. In the assembly 100, the evacuation spaces 511a-511h and the buffer spaces 512a-512f are spaces to be evacuated later (first space). The ventilation space 520 is a space (second space) for use to evacuate the first space (including the evacuation spaces 511a-511h and the buffer spaces 512a-512f). In particular, the evacuation spaces 511a-511h are to be evacuated to obtain glass panel units 10A-10H. On the other hand, the buffer spaces 512a-512f, as well as the evacuation spaces 511a-511h, are also evacuated for the purpose of increasing the production yield of the glass panel units 10A-10H, not to obtain the glass panel units 10A-10H.

As shown in FIG. 3, the partitions 420 are located within the area surrounded with the peripheral wall 410. Each of the partitions 420 is lower in height than the peripheral wall 410. Thus, as shown in FIG. 4, the peripheral wall 410 comes into contact with both of the first and second glass substrates 200, 300 earlier than the partitions 420 do. In the example illustrated in FIG. 3, the partitions 420a-420h are provided on the second glass substrate 300, and therefore, are spaced apart from the first glass substrate 200.

The plurality of partitions 420 have an elongate shape. Each partition 420 has two ends 423 (423a, 423b) in the length direction and two ends 424 (424a, 424b) in the width direction. Note that in FIG. 3, the reference signs 423 (423a, 423b) are added to only the second partition 422a, and the reference signs 424 (424a, 424b) are added to only the first partition 421d just for the purpose of making this drawing easily understandable. The plurality of partitions 420 includes first partitions 421 (421a-421d) and second partitions 422 (422a-422j). The respective lengths of the first partitions 421 (421a-421d) and second partitions 422 (422a-422j) are defined in two different directions. More specifically, the first partitions 421 (421a-421d) extend in a second direction perpendicular to a first direction in which the pair of first and second glass substrates 200, 300 face each other. In this embodiment, the first direction is defined along the thickness of the pair of glass substrates 200, 300 (i.e., the upward/downward direction in FIG. 4). The second direction is defined along the width of the pair of glass substrates 200, 300 (i.e., the upward/downward direction in FIG. 3). The second partitions 422 (422a-422j) extend in a third direction perpendicular to the first direction and also intersecting with the second direction. In this embodiment, the third direction is perpendicular to the second direction. The third direction is defined along the length of the pair of glass substrates 200, 300 (i.e., the rightward/leftward direction in FIG. 3).

More specifically, the first partitions 421a, 421b, 421c, 421d have an elongate shape and extend along the width of the pair of glass substrates 200, 300 (i.e., the upward/downward direction in FIG. 3). In each of the first partitions 421a, 421b, 421c, 421d, one side portion 424a thereof faces toward the first side 410a of the peripheral wall 410 (i.e., the right side in FIG. 3) and the other side portion 424b thereof faces toward the second side 410b of the peripheral wall 410 (i.e., the left side in FIG. 3).

The first partitions 421a, 421b, 421c, 421d are arranged at intervals in this order from the first side 410a of the peripheral wall 410 toward the second side 410b thereof along the length of the pair of glass substrates 200, 300 (i.e., the rightward/leftward direction in FIG. 3). Also, none of the first partitions 421a, 421b, 421c, 421d is in contact with the third side 410c or fourth side 410d of the peripheral wall 410.

The second partitions 422a-422j have an elongate shape and extend along the length of the pair of glass substrates 200, 300. In the second partitions 422a-422j, one end 423a thereof is an end facing toward the first side 410a of the peripheral wall 410 (i.e., the right side in FIG. 3) and the other end 423b thereof is an end facing toward the second side 410b of the peripheral wall 410 (i.e., the left side in FIG. 3).

The second partitions 422a, 422b are located between the second side 410b of the peripheral wall 410 and the first partition 421d. The second partitions 422a, 422b are arranged at intervals in this order from the third side 410c of the peripheral wall 410 toward the fourth side 410d thereof along the width of the pair of glass substrates 200, 300. The second partitions 422a, 422b are in contact with neither the second side 410b of the peripheral wall 410 nor the first partition 421d. In particular, one end 423a of the second partitions 422a, 422b faces a side portion 424b of the first partition 421d with a predetermined gap left between them.

The second partitions 422c, 422d are located between the first partitions 421c, 421d. The second partitions 422c, 422d are arranged at intervals in this order from the third side 410c of the peripheral wall 410 toward the fourth side 410d thereof along the width of the pair of glass substrates 200. The second partitions 422c, 422d are in contact with neither of the first partitions 421c, 421d. In particular, one end 423a of the second partitions 422c, 422d faces a side portion 424b of the first partition 421c with a predetermined gap left between them. The other end 423b of the second partitions 422c, 422d faces a side portion 424a of the first partition 421d with a predetermined gap left between them.

The second partitions 422e, 422f are located between the first partitions 421b, 421c. The second partitions 422e, 422f are arranged at intervals in this order from the third side 410c of the peripheral wall 410 toward the fourth side 410d thereof along the width of the pair of glass substrates 200, 300. The second partitions 422e, 422f are in contact with neither of the first partitions 421b, 421c. In particular, one end 423a of the second partitions 422e, 422f faces a side portion 424b of the first partition 421b with a predetermined gap left between them. The other end 423b of the second partitions 422e, 422f faces a side portion 424a of the first partition 421c with a predetermined gap left between them.

The second partitions 422g, 422h are located between the first partitions 421a, 421b. The second partitions 422g, 422h are arranged at intervals in this order from the third side 410c of the peripheral wall 410 toward the fourth side 410d thereof along the width of the pair of glass substrates 200, 300. The second partitions 422g, 422h are in contact with neither of the first partitions 421a, 421b. In particular, one end 423a of the second partitions 422g, 422h faces a side portion 424b of the first partition 421a with a predetermined gap left between them. The other end 423b of the second partitions 422g, 422h faces a side portion 424a of the first partition 421b with a predetermined gap left between them.

The second partitions 422i, 422j are located between the first side 410a of the peripheral wall 410 and the first partition 421a. The second partitions 422i, 422j are arranged at intervals in this order from the third side 410c of the peripheral wall 410 toward the fourth side 410d thereof along the width of the pair of glass substrates 200, 300. The second partitions 422i, 422j are in contact with neither the first side 410a of the peripheral wall 410 nor the first partition 421a. In particular, one end 423b of the second partitions 422i, 422j faces a side portion 424a of the first partition 421a with a predetermined gap left between them.

In the assembly 100, the evacuation space 511a is a space surrounded with the second and third sides 410b, 410c of the peripheral wall 410, the first partition 421d, and the second partition 422a. The evacuation space 511b is a space surrounded with the third side 410c of the peripheral wall 410, the first partitions 421c, 421d, and the second partition 422c. The evacuation space 511c is a space surrounded with the third side 410c of the peripheral wall 410, the first partitions 421b, 421c, and the second partition 422e. The evacuation space 511d is a space surrounded with the third side 410c of the peripheral wall 410, the first partitions 421a, 421b, and the second partition 422g. The evacuation space 511e is a space surrounded with the second side 410b of the peripheral wall 410, the first partition 421d, and the second partitions 422a, 422b. The evacuation space 511f is a space surrounded with the first partitions 421c, 421d, and the second partitions 422c, 422d. The evacuation space 511g is a space surrounded with the first partitions 421b, 421c and the second partitions 422e, 422f. The evacuation space 511h is a space surrounded with the first partitions 421a, 421b and the second partitions 422g, 422h. The buffer space 512a is a space surrounded with the first and third sides 410a, 410c of the peripheral wall 410, the first partition 421a, and the second partition 422i. The buffer space 512b is a space surrounded with the first side 410a of the peripheral wall 410, the first partition 421a, and the second partitions 422i, 422j. The buffer space 512c is a space surrounded with the second and fourth sides 410b, 410d of the peripheral wall 410, the first partition 421d, and the second partition 422b. The buffer space 512d is a space surrounded with the fourth side 410d of the peripheral wall 410, the first partitions 421c, 421d, and the second partition 422d. The buffer space 512e is a space surrounded with the fourth side 410d of the peripheral wall 410, the first partitions 421b, 421c, and the second partition 422f. The buffer space 512f is a space surrounded with the fourth side 410d of the peripheral wall 410, the first partitions 421a, 421b, and the second partition 422h. The ventilation space 520 is a space surrounded with the first and fourth sides 410a, 410d of the peripheral wall 410, the first partition 421a, and the second partition 422j.

In this embodiment, the gas adsorbent 60 is placed in only each of the evacuation spaces 511a-511h as shown in FIG. 3. That is to say, the gas adsorbents 60 are placed in the evacuation spaces 511a-511h, not in any of the buffer spaces 512a-512f or the ventilation space 520. Meanwhile, the plurality of pillars 70 are arranged over the entire internal space 500 (i.e., in each of the evacuation spaces 511a-511h, the buffer spaces 512a-512f, and the ventilation space 520) as shown in FIG. 1. That is to say, the plurality of pillars 70 are arranged over the evacuation spaces 511a-511h, the buffer spaces 512a-512f, and the ventilation space 520.

The plurality of air passages 600 is used to evacuate the first space (including the evacuation spaces 511a-511h and the buffer spaces 512a-512f) through the evacuation port 700. In other words, via the plurality of air passages 600, the evacuation spaces 511a-511h and the buffer spaces 512a-512f are connected (directly or indirectly) to the ventilation space 520. In this embodiment, the peripheral wall 410 and the partitions 420 (421a-421h, 422a-422i) are arranged out of contact with each other. The respective gaps left between the peripheral wall 410 and the partitions 420 constitute the air passages 600. The respective air passages 600 are closed by melting and deforming the partitions 420 once. This allows not only at least the evacuation spaces 511a-511h to be (hermetically) separated from each other but also the evacuation spaces 511a-511h and the buffer spaces 512a-512f to be (hermetically) separated from the ventilation space 520 (see FIG. 1).

In this embodiment, the plurality of air passages 600 includes a plurality of particular air passages 610 which are arranged in the second direction perpendicular to the first direction in which the pair of glass substrates 200, 300 face each other. The plurality of particular air passages 610 constitute ventilation paths P10 (P10a-P10h) that run through the internal space 500 in the second direction (i.e., the upward/downward direction in FIG. 3). Note that in FIG. 3, the ventilation paths P10 are shaded just for the purpose of making the description easily understandable. In this embodiment, the particular air passage 610 constituting the ventilation path P10a is a space (i.e., gap) between the respective ends 423a of the second partitions 422a, 422b and the side portion 424b of the first partition 421d. The particular air passage 610 constituting the ventilation path P10b is a space (i.e., gap) between the respective ends 423b of the second partitions 422c, 422d and the side portion 424a of the first partition 421d. The particular air passage 610 constituting the ventilation path P10c is a space (i.e., gap) between the respective ends 423a of the second partitions 422c, 422d and the side portion 424b of the first partition 421c. The particular air passage 610 constituting the ventilation path P10d is a space (i.e., gap) between the respective ends 423b of the second partitions 422e, 422f and the side portion 424a of the first partition 421c. The particular air passage 610 constituting the ventilation path P10e is a space (i.e., gap) between the respective ends 423a of the second partitions 422e, 422f and the side portion 424b of the first partition 421b. The particular air passage 610 constituting the ventilation path P10f is space (i.e., gap) between the respective ends 423b of the second partitions 422g, 422h and the side portion 424a of the first partition 421b. The particular air passage 610 constituting the ventilation path P10g is a space (i.e., gap) between the respective ends 423a of the second partitions 422g, 422h and the side portion 424b of the first partition 421a. The particular air passage 610 constituting the ventilation path P10h is a space (i.e., gap) between the respective ends 423b of the second partitions 422i, 422j and the side portion 424a of the first partition 421a.

The evacuation port 700 connects the ventilation space 520 to the external environment. The evacuation port 700 is used to evacuate the evacuation spaces 511a-511h and the buffer spaces 512a-512f through the ventilation space 520 and the air passages 600. Thus, the air passages 600, the ventilation space 520, and the evacuation port 700 together form an evacuation path for evacuating the evacuation spaces 511a-511h and the buffer spaces 512a-512f. The evacuation port 700 is cut through the second glass substrate 300 to connect the ventilation space 520 to the external environment. Specifically, the evacuation port 700 is provided at a corner of the second glass substrate 300.

1.2.3. Work in Progress of Glass Panel Units

Next, a work in progress 110 of glass panel units will be described. The work in progress 110 includes the pair of glass substrates (first and second glass substrates) 200, 300, a peripheral wall 41, and boundary walls 42 (42a-42m) as shown in FIGS. 1 and 2. In addition, the work in progress 110 further has an internal space 500 including the evacuation spaces 511a-511h, the buffer spaces 512a-512f, and the ventilation space 520. Besides, the work in progress 110 further includes gas adsorbents 60 and a plurality of pillars (spacers) 70 in the internal space 500. The work in progress 110 further has an evacuation port 700.

The peripheral wall 41 is provided between the pair of glass substrates 200, 300 to hermetically bond the pair of glass substrates 200, 300 together. The peripheral wall 41 is formed by once melting, and then solidifying again, the peripheral wall 410 of the assembly 100. Just like the peripheral wall 410 of the assembly 100, the peripheral wall 41 of the work in progress 110 also has a frame shape. In particular, the peripheral wall 41 has first to fourth sides 41a-41d. The first and second sides 41a, 41b extend along the width of the first and second glass substrates 200, 300 (i.e., in the upward/downward direction in FIG. 1). The third and fourth sides 41c, 41d extend along the length of the first and second glass substrates 200, 300 (i.e., the rightward/leftward direction in FIG. 1).

The boundary walls 42a-42m hermetically separate the internal space 500 surrounded with the pair of glass substrates 200, 300 and the peripheral wall 41 into the evacuation spaces 511a-511h, the buffer spaces 512a-512f, and the ventilation space 520. The boundary walls 42a-42m are formed out of the partitions 420 (421a-421d, 422a-422j). More specifically, the boundary wall 42a linearly extends along the width of the pair of glass substrates 200, 300 to couple together the third and fourth sides 41c, 41d of the peripheral wall 41. The boundary wall 42a is formed by deforming the first partition 421a. The boundary walls 42b-42d are elongate walls extending along the width of the pair of glass substrates 200, 300 and are coupled to the third side 41c of the peripheral wall 41. The boundary walls 42b-42d are formed by deforming the first partitions 421b-421d, respectively. The boundary walls 42e, 42f are elongate walls extending along the length of the pair of glass substrates 200, 300 to couple the second side 41b of the peripheral wall 41 to the boundary wall 42b. The boundary walls 42e, 42f are formed by deforming the second partitions 422a, 422b, respectively. The boundary walls 42g, 42h are elongate walls extending along the length of the pair of glass substrates 200, 300 to couple together the boundary walls 42c, 42d. The boundary walls 42g, 42h are formed by deforming the second partitions 422c, 422d, respectively. The boundary walls 42i, 42j are elongate walls extending along the length of the pair of glass substrates 200, 300 to couple together the boundary walls 42b, 42c. The boundary walls 42i, 42j are formed by deforming the second partitions 422e, 422f, respectively. The boundary walls 42k, 421 are elongate walls extending along the length of the pair of glass substrates 200, 300 to couple together the boundary walls 42a, 42b. The boundary walls 42k, 421 are formed by deforming the second partitions 422g, 422h, respectively. The boundary wall 42m is an elongate wall extending along the length of the pair of glass substrates 200, 300 to couple together the first side 41a of the peripheral wall 41 to the boundary wall 42a. The boundary wall 42m is formed by deforming the second partition 422j.

In particular, the boundary walls 42a-42m (hermetically) separate not only the evacuation spaces 511a-511h from each other but also the evacuation spaces 511a-511h and the buffer spaces 512a-512f from the ventilation space 520. Note that in this embodiment, the buffer spaces 512a, 512b are not (hermetically) separated from each other and the buffer spaces 512c-512f are not (hermetically) separated from each other, either. Optionally, however, the buffer spaces 512a, 512b may be (hermetically) separated from each other and the buffer spaces 512c-512f may also be (hermetically) separated from each other. That is to say, it may be determined arbitrarily whether or not the buffer spaces 512a-512f are (hermetically) separated from each other.

In the work in progress 110, the evacuation spaces 511a-511h and the buffer spaces 512a-512f are evacuated through the ventilation space 520 and the evacuation port 700 and have a lower internal pressure than the ventilation space 520, unlike the assembly 100. In this embodiment, the evacuation spaces 511a-511h and the buffer spaces 512a-512f are in a vacuum condition. Thus, it can be said that the evacuation spaces 511a-511h and the buffer spaces 512a-512f are vacuum spaces. As used herein, the "vacuum condition" refers to a condition with a degree of vacuum equal to or lower than a predetermined value. The predetermined value may be 0.1 Pa, for example. The evacuation spaces 511a-511h and the buffer spaces 512a-512f are perfectly closed hermetically by the first glass substrate 200, the second glass substrate 300, the peripheral wall 41, and the boundary walls 42a-42m, and therefore, are separated from the ventilation space 520 and the evacuation port 700.

In the work in progress 110, the evacuation space 511a is a space surrounded with the second and third sides 41b, 41c of the peripheral wall 41 and the boundary walls 42d, 42e. The evacuation space 511b is a space surrounded with the third side 41c of the peripheral wall 41 and the boundary walls 42c, 42d, 42g. The evacuation space 511c is a space surrounded with the third side 41c of the peripheral wall 41 and the boundary walls 42b, 42c, 42i. The evacuation space 511d is a space surrounded with the third side 41c of the peripheral wall 41 and the boundary walls 42a, 42b, 42k. The evacuation space 511e is a space surrounded with the second side 41b of the peripheral wall 41 and the boundary walls 42d, 42e, 42f. The evacuation space 511f is a space surrounded with the boundary walls 42c, 42d, 42g, 42h. The evacuation space 511g is a space surrounded with the boundary walls 42b, 42c, 42i, 42j. The evacuation space 511h is a space surrounded with the boundary walls 42a, 42b, 42k, 42l. The buffer spaces 512a, 512b are spaces surrounded with the first and third sides 41a, 41c of the peripheral wall 41 and the boundary walls 42a, 42m. The buffer spaces 512c-512f are spaces surrounded with the second and fourth sides 41b, 41d of the peripheral wall 41 and the boundary walls 42a, 42f, 42h, 42j, 42l. The ventilation space 520 is a space surrounded with the first and fourth sides 41a, 41d of the peripheral wall 41 and the boundary walls 42a, 42m.

As can be seen, the peripheral wall 41 and the boundary walls 42a-42m include, as their integral parts, a plurality of frame members 40 that surround the evacuation spaces 511a-511h. In other words, those parts, surrounding the respective evacuation spaces 511a-511h, of the peripheral wall 41 and the boundary walls 42a-42m form the frame members 40.

In the work in progress 110, the pressure inside the evacuation spaces 511a-511h is lower than in the ventilation space 520 including the evacuation port 700 (i.e., the atmospheric pressure). Thus, force that is going to narrow the gap between the pair of glass substrates 200, 300 is applied to the part to be used as the glass panel units 10 (10A-10H) (i.e., the evacuation spaces 511a-511h). Meanwhile, the pressure inside the ventilation space 520 becomes equal to the atmospheric pressure. Thus, in the ventilation space 520 that is a part not used as the glass panel units 10 (10A-10H), force is produced which resists the force that is going to narrow the gap between the pair of glass substrates 200, 300. In this embodiment, in that part not used as the glass panel units 10 (10A-10H), the buffer spaces 512a-512f are provided. In the buffer spaces 512a-512f, as well as in the evacuation spaces 511a-511h, the pressure is lower than in the ventilation space 520. Providing such buffer spaces 512a-512f reduces the part, of which the internal pressure is equal to the atmospheric pressure (i.e., the part that produces the force resisting the force that is going to narrow the gap between the pair of glass substrates 200, 300), in the work in progress 110. This reduces the unbeneficial effect of the difference in pressure between the part corresponding to the evacuation spaces 511a-511h of the pair of glass substrates 200, 300 and the rest of the pair of glass substrates 200, 300.

Therefore, this reduces the chances of causing damage to the pair of glass substrates 200, 300 and the boundary walls 42a-42m due to such a pressure difference. Consequently, this work in progress 110 of glass panel units contributes to increasing the production yield. In this embodiment, in the work in progress 110, the ventilation space 520 is a rectangular space. For example, suppose the glass substrates 200, 300 have a longitudinal dimension of 2400 mm (the longer sides) and a lateral dimension of 1500 mm (shorter sides) just by way of example. In that case, the ventilation space 520 suitably has a lateral dimension of 500 mm or less and suitably has an area of 250,000 mm$^2$ or less in a plan view. More suitably, the ventilation space 520 has a lateral dimension of 350 mm or less and has an area of 90,000 mm$^2$ or less in a plan view. Stated otherwise, in a plan view, the ratio of the area of the ventilation space 520 to the area of the internal space 500 is 10% or less, suitably 7% or less, more suitably 2.5% or less. In particular, the buffer spaces 512a, 512b are adjacent to the evacuation spaces 511d, 511h, respectively, and the buffer spaces 512c-512f are adjacent to the evacuation spaces 511e-511h, respectively. Therefore, particularly advantageous effects would be achieved in the evacuation spaces 511d-511h adjacent to the buffer spaces 512a-512f, respectively.

1.3. Manufacturing Method

Next, a method for manufacturing the glass panel units 10 (10A-10H) using the assembly 100 will be described with reference to FIGS. 3-23. This method for manufacturing the glass panel units 10 includes preparatory steps and a removing step.

The preparatory steps are steps of providing the work in progress 110 shown in FIGS. 1 and 2. The preparatory steps include an assembling step, a first melting step, an evacuation step, and a second melting step.

The assembling step is the step of providing the assembly 100. That is to say, the assembling step is the step of forming the first glass substrate 200, the second glass substrate 300, the peripheral wall 410, the partitions 420, the internal space 500, the air passages 600, the evacuation port 700, the plurality of gas adsorbents 60, and the plurality of pillars 70 to obtain the assembly 100. The assembling step includes first to sixth steps. Optionally, the order in which the second to fifth steps are performed may be changed as appropriate.

The first step is the step of forming the first glass substrate 200 and the second glass substrate 300 (i.e., a substrate forming step). For example, the first step includes making the first glass substrate 200 and the second glass substrate 300. If necessary, the first step may further include cleaning the first glass substrate 200 and the second glass substrate 300.

Figure 5:
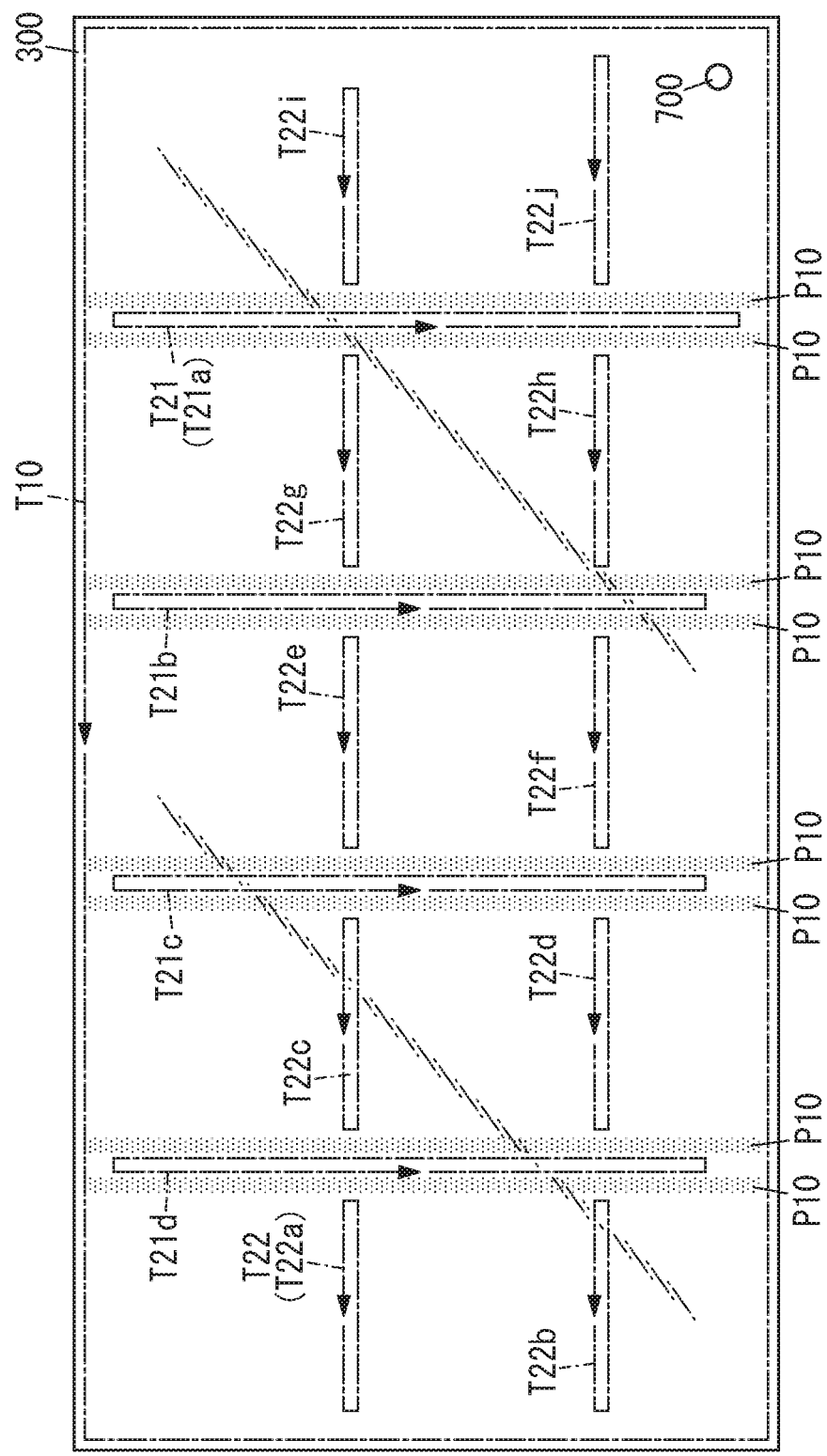
FIG. 5 illustrates how to perform a preparatory step (assembling step) in a method for manufacturing a glass panel unit according to the exemplary embodiment.

The second step is the step of forming the evacuation port 700. The second step includes cutting the evacuation port 700 through the second glass substrate 300 as shown in FIG. 5. If necessary, the second step includes cleaning the second glass substrate 300.

The third step is the step of arranging the peripheral wall 410 and the partitions 420 (including the first partitions 421a-421d and the second partitions 422a-422j) (sealant arrangement step). The third step includes a peripheral wall forming step and a partition forming step.

Figure 6:
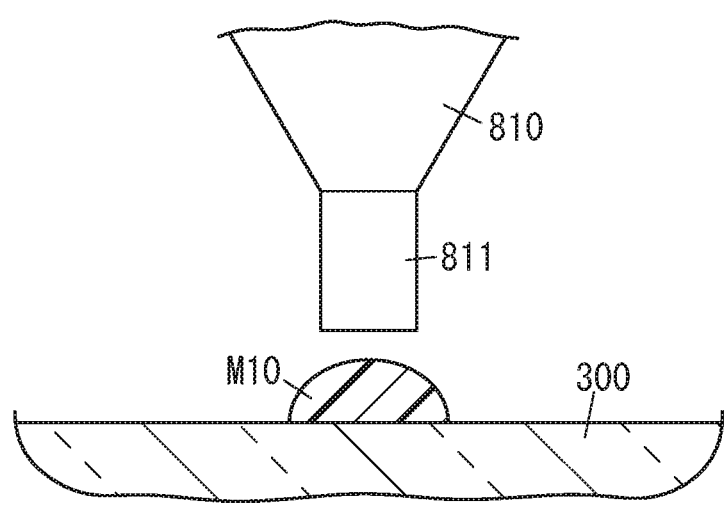
FIG. 6 illustrates how to perform the preparatory step (assembling step) in the manufacturing method.
Figure 7:
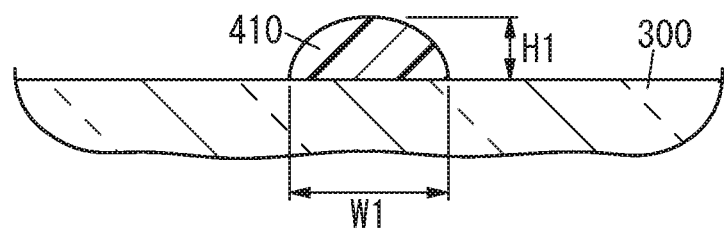
FIG. 7 illustrates how to perform the preparatory step (assembling step) in the manufacturing method.

The peripheral wall forming step is the step of forming the peripheral wall 410. More specifically, the peripheral wall forming step is the step of forming the peripheral wall 410 by applying a material for the peripheral wall 410 (first sealant) M10 through a dispenser 810 onto one of the pair of glass substrates 200, 300 (e.g., the second glass substrate 300 in this example) as shown in FIG. 6. In the peripheral wall forming step, when the material M10 for the peripheral wall 410 is applied onto the second glass substrate 300, the material M10 for the peripheral wall 410 discharged through a nozzle 811 of the dispenser 810 is not to be pressed by the nozzle 811 as shown in FIG. 6. Then, the dispenser 810 is moved along the peripheral edges of the second glass substrate 300 (e.g., along the path T10 shown in FIG. 5) while discharging the material M10 through the nozzle 811. Thereafter, the material M10 is allowed to dry to form the peripheral wall 410. In this manner, a peripheral wall 410, of which the first to fourth sides 410a-410d have a height H1 and a width W1, is obtained as shown in FIG. 7. The height of the peripheral wall 410 defines the dimension of the peripheral wall 410 in the direction in which the pair of glass substrates 200, 300 face each other. In this embodiment, the height of the peripheral wall 410 is the height H1 of the first to fourth sides 410a-410d. The height H1 and the width W1 may be adjusted according to the traveling velocity of the dispenser 810 and the rate of discharging the material M10, for example.

Figure 8:
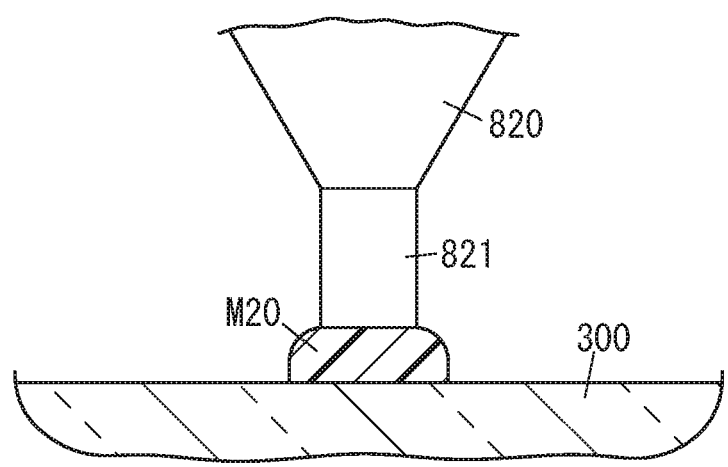
FIG. 8 illustrates how to perform the preparatory step (assembling step) in the manufacturing method.
Figure 9:
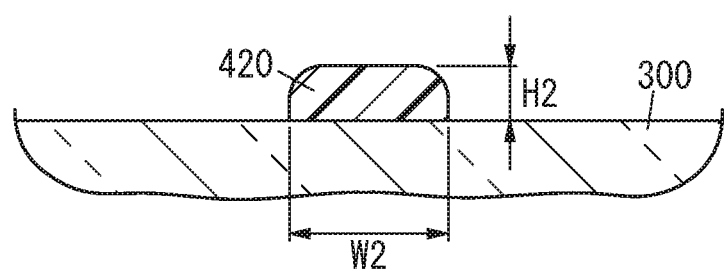
FIG. 9 illustrates how to perform the preparatory step (assembling step) in the manufacturing method.

The partition forming step is the step of forming the first partitions 421a-421d and the second partitions 422a-422j. In the following description of the partition forming step, when there is no need to distinguish the first partitions 421a-421d and the second partitions 422a-422j from each other, the first partitions 421a-421d and the second partitions 422a-422j will be hereinafter collectively referred to "partitions 420." This partition forming step is the step of forming the partitions 420 by applying a material (second sealant) M20 for the partitions 420 through a dispenser 820 onto one of the pair of glass substrates 200, 300 (e.g., the second glass substrate 300 in this example) as shown in FIG. 8. As can be seen, the partition forming step includes an application step of applying the material M20 for the plurality of partitions 420 onto one of the pair of glass substrates 200, 300. In this partition forming step, when the material M20 for the partitions 420 is applied onto the second glass substrate 300, the material M20 for the partitions 420 discharged through a nozzle 821 of the dispenser 820 is pressed by the nozzle 821 as shown in FIG. 8. This is done to adjust the height of the partitions 420. This allows the partitions 420 obtained to have a height H2 which is smaller than the height H1 of the peripheral wall 410 as shown in FIG. 9. The height of the partitions 420 is the dimension of the partitions 420 in the direction in which the pair of glass substrates 200, 300 face each other. The width W2 of the partitions 420 may be adjusted according to the traveling velocity of the dispenser 820 and the discharge rate of the material M20, for example. However, the range in which the width W2 is adjustable by the traveling velocity of the dispenser 820. the discharge rate of the material M20, or any other parameter has a limit. Thus, in this embodiment, to make the width W2 of the partitions 420 greater than the width of the peripheral wall 410 (i.e., the width W1 of the first to fourth sides 410a-410d thereof), the material M20 for the partitions 420 is applied so that the materials M20 are adjacent to one another in a direction defining the width of the partitions 420 an increased number of times. That is to say, the number of times of applying the material M20 so that the materials M20 are adjacent to one another in the direction defining the width of the partitions 420 is greater than the number of times of applying the material M10 so that the materials M10 are adjacent to one another in the direction defining the width of the peripheral wall 410 (i.e., the width of the respective sides 410a-410d). In other words, when the partitions 420 are formed, the number of application lines is increased compared to when the peripheral wall 410 is formed.

Figure 10:
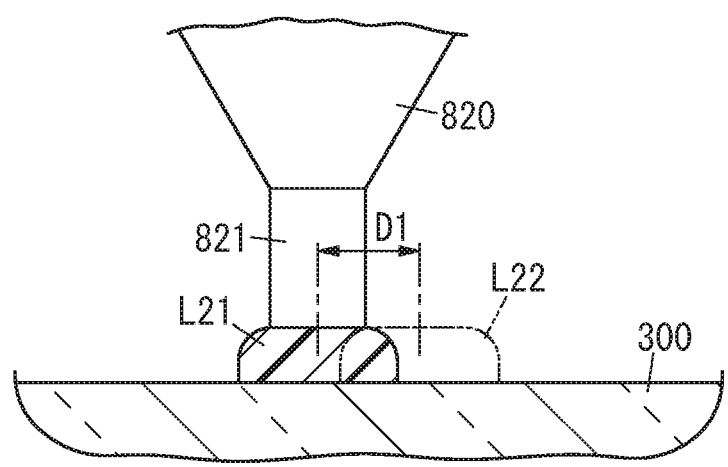
FIG. 10 illustrates how to perform the preparatory step (assembling step) in the manufacturing method.
Figure 11:
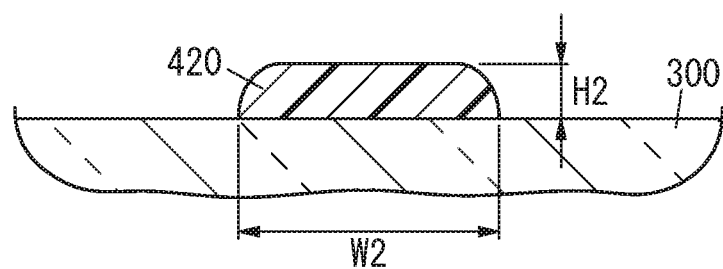
FIG. 11 illustrates how to perform the preparatory step (assembling step) in the manufacturing method.

In this embodiment, two application lines L21, L22 are formed by applying the material M20 for the partitions 420 twice in the direction defining the length of the partitions 420 so that the materials M20 are adjacent to one another in the direction defining the width of the partitions 420 as shown in FIG. 10. Specifically, the dispenser 820 is moved along the sides of quadrangles as indicated by the paths T21a-T21d, T22a-T22j as shown in FIG. 5 with the material M20 discharged through the nozzle 821. Note that the paths T21a-T21d correspond to the first partitions 421a-421d, respectively, and the paths T22a-T22j correspond to the second partitions 422a-422j, respectively. In the following description, when there is no need to distinguish the paths T21a-T21d from each other, the reference sign T21 will be used as needed to refer to those paths. Likewise, when there is no need to distinguish the paths T22a-T22j from each other, the reference sign T22 will be used as needed to refer to those paths. In this case, the interval D1 between the two adjacent application lines L21, L22 is set such that the respective surfaces of the two adjacent application lines L21, L22 are connected to be level with each other (i.e., located on the same plane). This eliminates a recess from between the respective surfaces of the adjacent application lines L21, L22. This allows a partition 420 with a flat surface to be obtained as shown in FIG. 11.

Thereafter, the material M20 is allowed to dry, thereby forming the partitions 420. In this manner, partitions 420 (421a-421d, 422a-422j) with the height H2 and the width W2 are obtained as shown in FIG. 11. As can be seen, in the partition forming step, the material M20 for the partitions 420 discharged through the nozzle 821 of the dispenser 820 is pressed with the nozzle 821 of the dispenser 820. This makes the partitions 420 lower in height than the peripheral wall 410. In addition, in the partition forming step, the number of times of applying the material M20 so that the materials M20 are adjacent to one another in the direction defining the width of the partitions 420 is larger than the number of times of applying the material M10 so that the materials M10 are adjacent to one another in the direction defining the width of the respective sides 410a-410d of the peripheral wall 410 as described above. This allows the partitions 420 to have a broader width than the peripheral wall 410.

Figure 13:
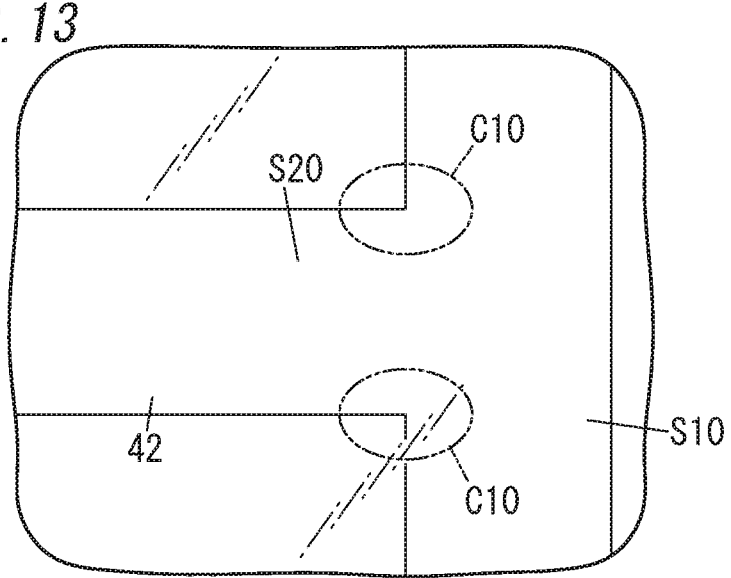
FIG. 13 illustrates how to perform the preparatory step (assembling step) in the manufacturing method.
Figure 14:
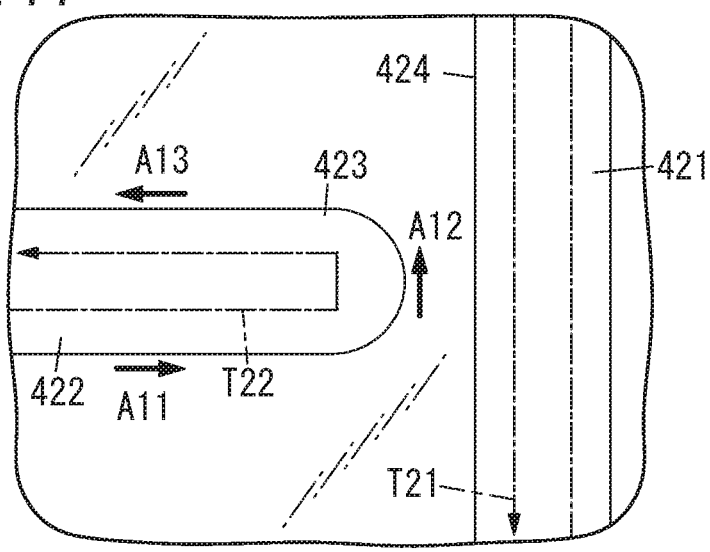
FIG. 14 illustrates how to perform the preparatory step (assembling step) in the manufacturing method.
Figure 15:
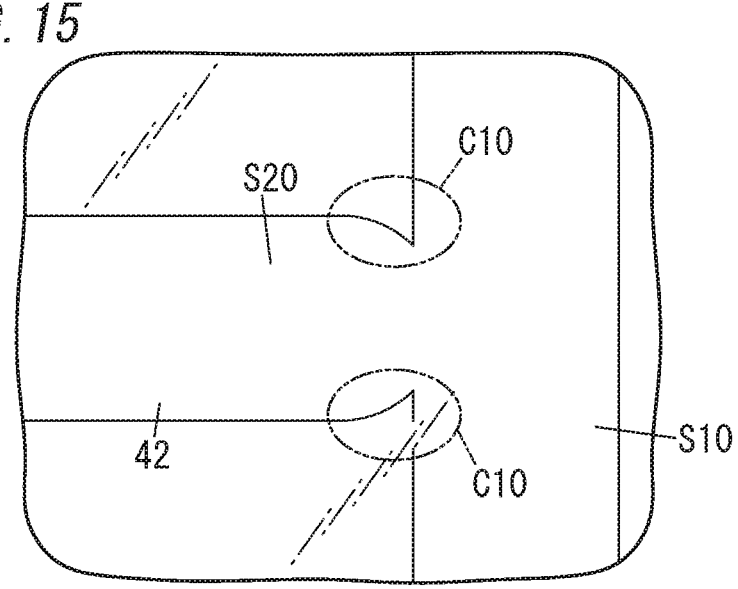
FIG. 15 illustrates how to perform the preparatory step (assembling step) in the manufacturing method.

In this embodiment, each of the second partitions 422 (422a-422j) has, at an end 423 thereof, a swollen portion 425 protruding toward both ends along the width of the second partition 422 (i.e., in the upward/downward direction in FIG. 12) as shown in FIG. 12. The swollen portion 425 has a broader width than the body (middle portion) of the second partition 422. In FIG. 12, the swollen portion 425 has a spherical shape. This swollen portion 425 makes, when a boundary wall 42 is formed by deforming the first partition 421 and the second partition 422, the angle defined by the corner portions C10 closer to the angle of intersection between the first partition 421 and the second partition 422 (e.g., 90 degrees in this embodiment) as shown in FIG. 13. Each of the corner portions C10 includes the corner of a connecting portion between a region S10 defined by the first partition 421 in the boundary wall 42 and a region S20 defined by the second partition 422 in the boundary wall 42. For example, if the second partition 422 has no swollen portions 425 at the end 423 as shown in FIG. 14, then the connecting portion between the regions S10 and S20 may have depressions as shown in FIG. 15. In that case, the angle defined by the corner portions C10 becomes significantly different from the angle of intersection between the first partition 421 and the second partition 422 (e.g., 90 degrees in this embodiment). Such depressions at the connecting portion could cause a decline in the strength of the boundary wall 42 and a decline in the appearance thereof. In this embodiment, the swollen portion 425 is provided at each of the two ends 423 of the partition 422. This reduces the chances of the partition 420 (boundary wall 42) coming to have depressions and have a decreased width in the region where the partition 420 closes the air passage 600. This curbs a decline in the strength of the partition 420 (boundary wall 42) and contributes to increasing the production yield. In particular, this curbs a decline in the strength at the connecting portion between the regions S10, S20 defined by the partitions 421, 422 and a decline in appearance. Optionally, the swollen portion 425 may also be provided at each of the two ends 423 of the partition 421. This would curb a decline in strength and appearance at a connecting portion between the boundary wall 42 and the peripheral wall 41. Note that the swollen portion 425 just needs to protrude toward the evacuation space 511 at least along the width of the second partition 422. For example, if the second partition 422 is located between an evacuation space 511 and any other type of space (i.e., a buffer space 512 or the ventilation space 520), then the swollen portion 425 just needs to protrude toward the evacuation space 511 at least along the width of the second partition 422. In other words, the swollen portion 425 does not have to protrude toward the space (i.e., the buffer space 512 or the ventilation space 520) other than the evacuation space 511 along the width of the second partition 422. This is because the decline in the strength of the boundary wall 42 does not pose a significant problem in those spaces other than the evacuation space 511. Note that if the second partition 422 is located between two evacuation spaces 511, naturally the swollen portion 425 suitably protrudes toward both ends along the width of the second partition 422.

The swollen portion 425 may be formed by adjusting the velocity of the dispenser 820 traveling along the path T22 while discharging the material M20 through its nozzle 821. Specifically, the traveling velocity of the dispenser 820 applying the material M20 along one of the shorter sides of the second partition 422 (i.e., the velocity of the dispenser 820 traveling in the direction indicated by the arrow A12) may be set to be lower than that of the dispenser 820 applying the material M20 along the longer sides of the second partition 422 (i.e., in the directions indicated by the arrows A11, A13). This allows the swollen portion 425 shown in FIG. 12 to be obtained. Suppose the traveling velocity of the dispenser 820 applying the material M20 along one of the shorter sides of the second partition 422 (i.e., the velocity of the dispenser 820 traveling in the direction indicated by the arrow A12) is set to be equal to or higher than that of the dispenser 820 applying the material M20 along the longer sides of the second partition 422 (i.e., in the directions indicated by the arrows A11, A13). In that case, a tapered end 423 with no swollen portion 425 will be obtained as shown in FIG. 14.

The fourth step is the step of forming pillars 70 (pillar forming step). The fourth step includes forming a plurality of pillars 70 in advance and placing, using a chip mounter or any other tool, the plurality of pillars 70 at predetermined positions on the second glass substrate 300. In particular, the fourth step includes placing the pillars 70 in the evacuation spaces 511a-511h, the buffer spaces 512a-512f, and the ventilation space 520. In this embodiment, the pillars 70 are lower in height than the partitions 420. Alternatively, the pillars 70 may also be formed by a combination of photolithography and etching techniques. In that case, the plurality of pillars 70 may be made of a photocurable material, for example. Still alternatively, the plurality of pillars 70 may also be formed by a known thin film forming technique.

The fifth step is the step of forming the gas adsorbents 60 (gas adsorbent forming step). The fifth step includes forming the gas adsorbents 60 by applying, using a dispenser, for example, a solution in which a powder of a getter is dispersed onto predetermined positions on the second glass substrate 300 and drying the solution. In particular, the fifth step includes arranging the gas adsorbent 60 in each of the evacuation spaces 511a-511h without arranging the gas adsorbent 60 in any of the buffer spaces 512a-512f or the ventilation space 520.

Figure 16:
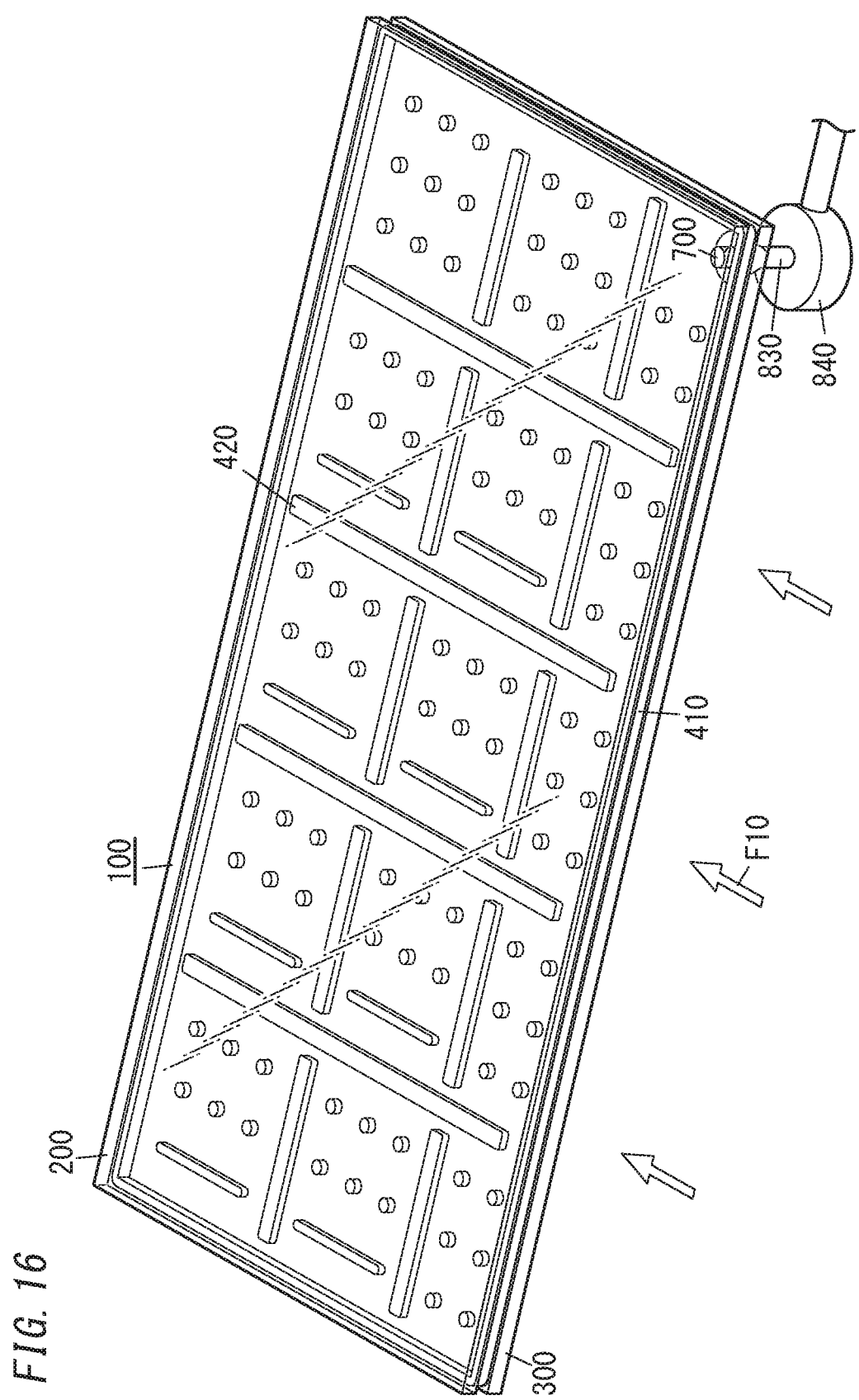
FIG. 16 illustrates how to perform the preparatory step (assembling step) in the manufacturing method.

By performing these first to fifth steps, the peripheral wall 410, the partitions 420, the air passages 600, the evacuation port 700, the plurality of gas adsorbents 60, and the plurality of pillars 70 are formed on the second glass substrate 300 as shown in FIG. 16.

The sixth step is the step of arranging the first glass substrate 200 and the second glass substrate 300 (arrangement step). In the sixth step, the first glass substrate 200 and the second glass substrate 300 are arranged to be parallel to each other and face each other as shown in FIG. 16.

The assembly 100 is obtained by performing this assembling step. After the assembling step has been performed, the first melting step (bonding step), the evacuation step, and the second melting step (sealing step) are carried out.

The first melting step is the step of melting the peripheral wall 410 once to hermetically bond the pair of glass substrates 200, 300 together with the peripheral wall 410. Specifically, the first glass substrate 200 and the second glass substrate 300 are loaded into a melting furnace and heated at a first melting temperature for a predetermined amount of time (first melting time). The first melting temperature and the first melting time are set such that the first glass substrate 200 and the second glass substrate 300 are hermetically bonded together with the peripheral wall 410 but that the air passages 600 are not closed with the partitions 420. That is to say, the lower limit of the first melting temperature is the softening point of the peripheral wall 410 but the upper limit of the first melting temperature is set such that the air passages 600 are not closed with the partitions 420. For example, if the softening point of the peripheral wall 410 and the partitions 420 is 434° C., the first melting temperature may be set at 440° C. The first melting time may be 10 minutes, for example. Also, in this first melting step, the peripheral wall 410 softens too much to support the first glass substrate 200 by itself anymore, and therefore, the first glass substrate 200 is supported by the partitions 420 instead.

In this embodiment, the assembly 100 has ventilation paths P10 (P10a-P10h) running through the internal space 500 in the second direction (i.e., along the width of the pair of glass substrates 200, 300) as shown in FIG. 3. Thus, the first melting step includes letting hot air F10 blow in the second direction to heat the assembly 100 in the melting furnace (see FIG. 16). That is to say, the hot air F10 is allowed to pass through the ventilation paths P10 while the assembly 100 is heated. This allows the heat to be conducted sufficiently into the partitions 420 in the internal space 500 of the assembly 100, thus facilitating heating the assembly 100 (heating the partitions 420 among other things). This allows unnecessary components such as a binder included in the material (second sealant) for the partitions 420 which often emit a gas to be removed sufficiently through the first melting step. Therefore, this curbs a decline in production yield due to a gas produced from those unnecessary components, thus contributing to increasing the production yield of glass panel units.

The evacuation step is the step of evacuating the evacuation spaces 511a-511h and the buffer spaces 512a-512f through the air passages 600, the ventilation space 520, and the evacuation port 700 and thereby creating a vacuum condition in the evacuation spaces 511a-511h and the buffer spaces 512a-512f (i.e., turning these spaces into vacuum spaces). The evacuation may be implemented using a vacuum pump, for example. The vacuum pump may be connected to the assembly 100 via an evacuation pipe 830 and a sealing head 840 as shown in FIG. 16. The evacuation pipe 830 may be bonded to the second glass substrate 300 such that the inside of the evacuation pipe 830 and the evacuation port 700 communicate with each other, for example. Bonding the evacuation pipe 830 to the glass substrates 300 may be done with an adhesive 850, for example. The adhesive 850 may be a glass frit, for example. Then, the sealing head 840 is attached to the evacuation pipe 830, thereby connecting a suction port of the vacuum pump to the evacuation port 700. The first melting step, the evacuation step, and the second melting step are performed with the assembly 100 kept loaded in the melting furnace. Therefore, the evacuation pipe 830 is bonded to the second glass substrate 300 at least before the first melting step.

The evacuation step includes evacuating the evacuation spaces 511a-511h and the buffer spaces 512a-512f at a temperature equal to or higher than an evacuation temperature for a predetermined amount of time (evacuation time) via the air passages 600, the ventilation space 520, and the evacuation port 700 before the second melting step is started. The evacuation temperature is set at a temperature higher than the activation temperature (e.g., 350° C.) of the getter of the gas adsorbent 60 but lower than the softening point (e.g., 434° C.) of the partitions 420. The evacuation temperature may be 390° C., for example. This prevents the partitions 420 from being deformed. In addition, this causes the getter of the gas adsorbent 60 to be activated and also causes the molecules (gas) adsorbed onto the getter to be released from the getter. Then, the molecules (i.e., the gas) released from the getter is exhausted through the evacuation spaces 511a-511h, the buffer spaces 512a-512f, the air passages 600, the ventilation space 520, and the evacuation port 700. Thus, this evacuation step allows the gas adsorbent 60 to recover its adsorption ability. The evacuation time is set so as to create a vacuum space with a predetermined degree of vacuum (e.g., a degree of vacuum of 0.1 Pa or less) in the evacuation spaces 511a-511h and the buffer spaces 512a-512f. The evacuation time may be set at 120 minutes, for example.

Figure 17:
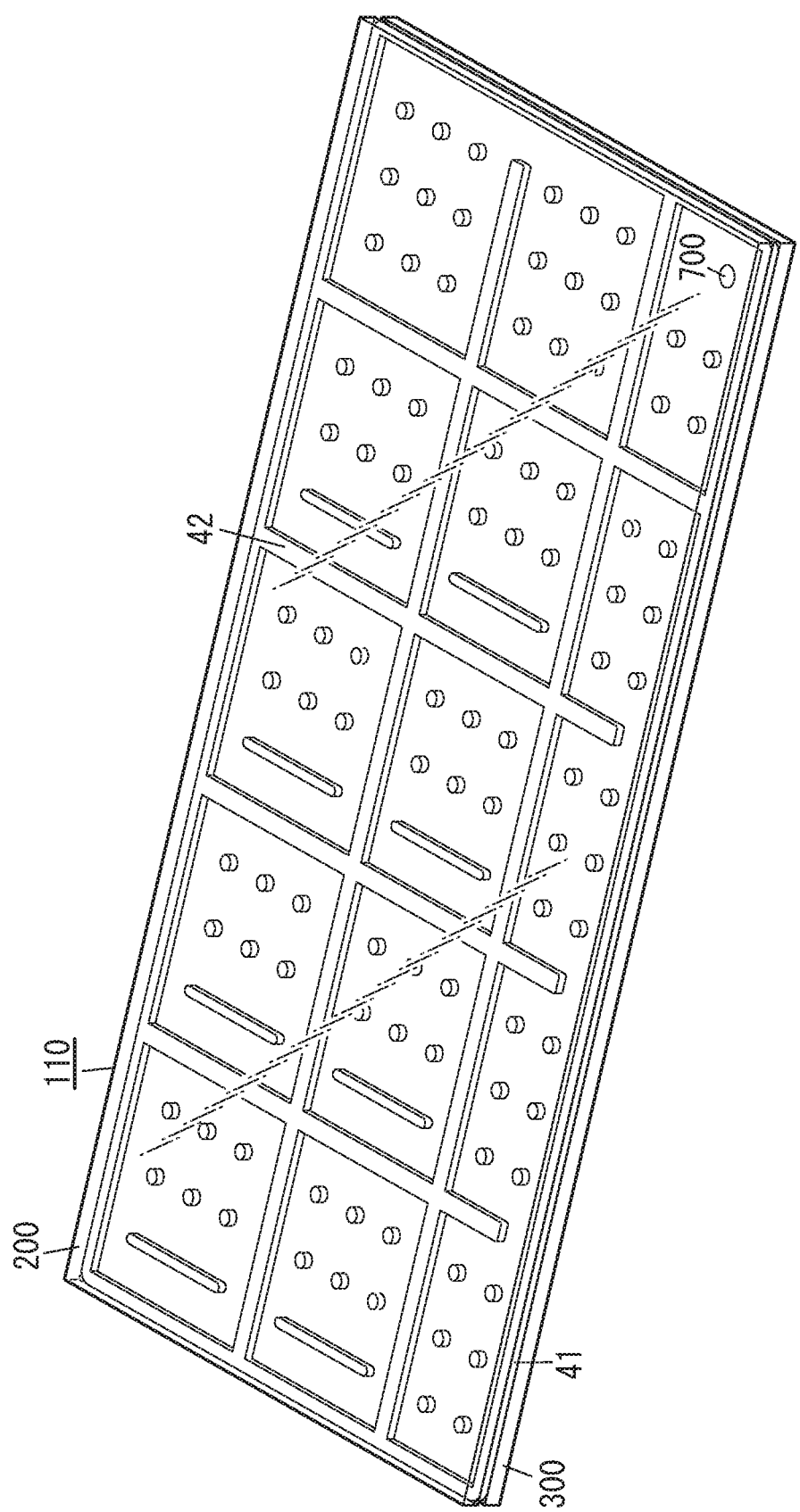
FIG. 17 illustrates how to perform the preparatory step (assembling step) in the manufacturing method.

The second melting step is the step of closing the air passages 600 by deforming the partitions 420 to form the boundary walls 42 and thereby obtain the work in progress 110. That is to say, the second melting step includes closing the air passages 600 to form a plurality of frame members 40 surrounding the evacuation spaces 511a-511h. As a result, as shown in FIGS. 1, 2, and 17, boundary walls 42a-42m are formed which hermetically separate the internal space 500 into the evacuation spaces 511a-511h, the buffer spaces 512a-512f, and the ventilation space 520. In other words, the second melting step is the step of forming the boundary walls 42a-42m that hermetically separate the internal space 500 into the evacuation spaces 511a-511h, the buffer spaces 512a-512f, and the ventilation space 520 by deforming the partitions 420 to close the air passages 600. Note that in the second melting step, the partitions 420 soften too much to support the first glass substrate 200 by themselves anymore, and therefore, the first glass substrate 200 is supported by the pillars 70 instead.

More specifically, melting the partitions 420 once at a predetermined temperature (second melting temperature) equal to or higher than the softening point of the partitions 420 causes the partitions 420 to be deformed. Specifically, the first glass substrate 200 and the second glass substrate 300 are heated in the melting furnace at a second melting temperature for a predetermined amount of time (second melting time). The second melting temperature and the second melting time are set such that the partitions 420 are softened to close the air passages 600. The lower limit of the second melting temperature is the softening point (e.g., 434° C.) of the partitions 420. The second melting temperature may be set at 460° C., for example. Also, the second melting time may be 30 minutes, for example.

In addition, in the second melting step, the internal space 500 continues to be evacuated. That is to say, the second melting step includes forming the boundary walls 42a-42m that close the air passages 600 by deforming the partitions 420 at the second melting temperature while evacuating the evacuation spaces 511a-511h and the buffer spaces 512a-512f via the air passages 600, the ventilation space 520, and the evacuation port 700. This further reduces the chances of the degree of vacuum in the evacuation spaces 511a-511h and the buffer spaces 512a-512f decreasing during the second melting step. Nevertheless, in the second melting step, the internal space 500 does not have to be evacuated continuously. Optionally, the second melting step may also be the step of closing, by deforming the partitions 420, all of the plurality of air passages 600 but at least the air passages 600 that connect the buffer spaces 512a-512f. That is to say, the air passages 600 between the buffer spaces 512a-512f do not have to be closed. Optionally, however, the air passages 600 between the buffer spaces 512a-512f may also be closed along with the other air passages 600.

Figure 18:
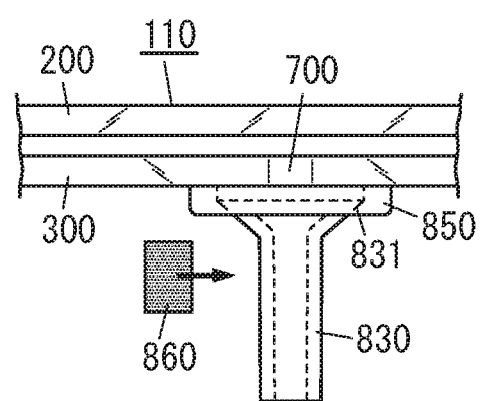
FIG. 18 illustrates how to perform the preparatory step (assembling step) in the manufacturing method.
Figure 19:
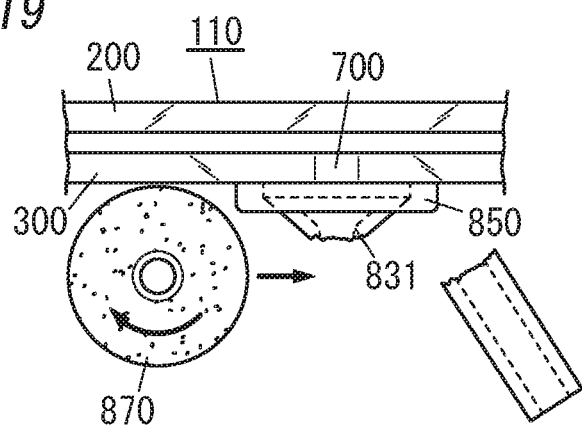
FIG. 19 illustrates how to perform the preparatory step (assembling step) in the manufacturing method.
Figure 20:
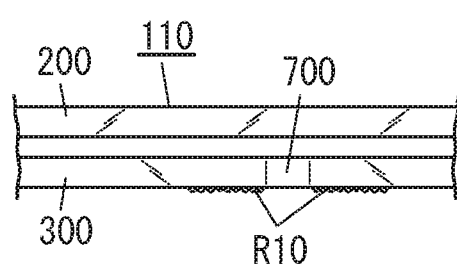
FIG. 20 illustrates how to perform the preparatory step (assembling step) in the manufacturing method.
Figure 21:
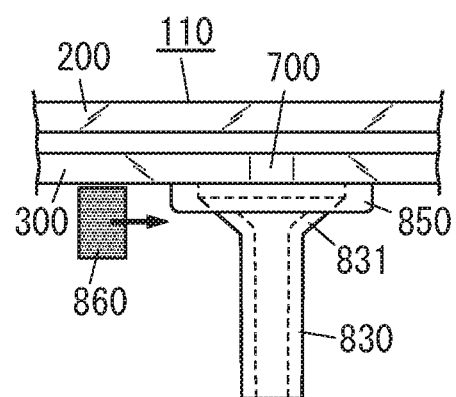
FIG. 21 illustrates how to perform the preparatory step (assembling step) in the manufacturing method.
Figure 22:
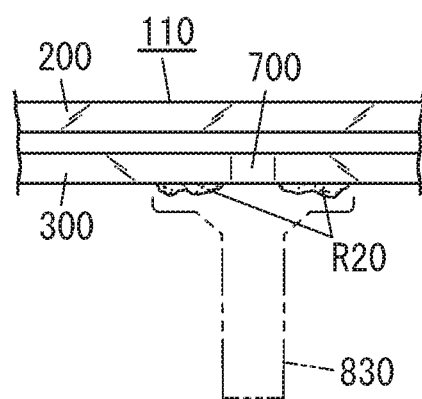
FIG. 22 illustrates how to perform the preparatory step (assembling step) in the manufacturing method.

The sealing step includes removing the evacuation pipe 830 after having formed the boundary walls 42. To remove the evacuation pipe 830, the evacuation pipe 830 is removed with a bonding portion 831 adhered to the glass substrate 300 left, and then the bonding portion 831 is scraped off. More specifically, first, impact is applied by a relatively hard object 860 to the evacuation pipe 830 as shown in FIG. 18 to break the evacuation pipe 830, and then the evacuation pipe 830 is removed with the bonding portion 831 left as shown in FIG. 19. The impact is suitably applied by the object 860 to the evacuation pipe 830 gently enough to prevent the pair of glass substrates 200, 300 from breaking. Next, the bonding portion 831 of the evacuation pipe 830, as well as the adhesive 850, is scraped off by a grinder 870 as shown in FIG. 19. In this manner, the evacuation pipe 830 is removed from the glass substrate 300 as shown in FIG. 20. In this case, the region surrounding the evacuation port 700 of the glass substrate 300 is not a mirror surface but a rough surface R10. The rough surface R10 may be regarded as showing the traces of the bonding portion 831 of the evacuation pipe 830 being scraped off by the grinder 870 or any other tool. In this case, the evacuation pipe 830 could be removed along with the adhesive 850 by the object 860 without using the grinder 870 as shown in FIG. 21. However, to remove the evacuation pipe 830 along with the adhesive 850 using the object 860, greater impact should be applied compared to breaking the evacuation pipe 830 only, thus increasing the chances of the pair of glass substrates 200, 300 breaking. In addition, in that case, the adhesive 850 could not be removed completely but a residue R20 of the adhesive 850 would be left around the evacuation port 700 of the glass substrate 300 as shown in FIG. 22. Such a residue R20 would protrude from the surface of the glass substrate 300, and therefore, might pose an obstacle to transportation of the work in progress 110, for example. For example, when a plurality of works in progress 110 are going to be piled one on top of another during the transportation of the plurality of works in progress 110, the residue R20 might pose an obstacle by coming into contact with other works in progress 110 or could cause damage to the other works in progress 110. In contrast, the method shown in FIGS. 18-20 not only reduces the impact applied by the object 860 but also leaves no residues R20. This reduces the chances of the glass substrates 200, 300 breaking and facilitates the transportation of the works in progress 110.

By performing these preparatory steps, the work in progress 110 shown in FIGS. 3, 4, and 17 is obtained. In the work in progress 110, the peripheral wall 410 and the partitions 420 are once melted in the first melting step and the second melting step. Thus, the gap between the pair of glass substrates 200, 300 is defined by the pillars 70, not the peripheral wall 410. Although the partitions 420 and the peripheral wall 410 have different heights, the same core material is dispersed in the first sealant and the second sealant. Thus, the peripheral wall 41 and the boundary walls 42 to be formed out of the partitions 420 and the peripheral wall 410 will have the same height. This allows the frame member 40 to have a uniform height.

The removing step is performed after the preparatory steps have been performed. The removing step is the step of obtaining glass panel units 10A-10H out of the work in progress 110. The removing step is the step of obtaining glass panel units 10A-10H as parts including the evacuation spaces 511a-511h, respectively, by removing parts 11 (11A, 11B) including the buffer spaces 512a-512f and the ventilation space 520. That is to say, the removing step includes cutting off the work in progress 110 into the glass panel units 10A-10H. In the work in progress 110, the glass panel units 10A-10H form integral parts thereof. Thus, the glass panel units 10A-10H are separated from each other by cutting off the work in progress 110. For example, as shown in FIG. 1, the work in progress 110 (in particular, the glass substrates 200, 300) may be cut off along the cutting lines 900 aligned with the boundary walls 42. In this embodiment, the plurality of pillars 70 are placed over the entire internal space 500 (in each of the evacuation spaces 511a-511h, the buffer spaces 512a-512f, and the ventilation space 520). This allows the stress applied to the pair of glass substrates 200, 300 while the work in progress 110 is being cut off to be uniformly distributed by the plurality of pillars 70, thus reducing the chances of causing damage to the pair of glass substrates 200, 300 or causing cutting failures.

By performing the removing step described above, glass panel units 10A-10H are obtained from the work in progress 110 as shown in FIG. 23. At this time, a part 11 (11A) including the buffer spaces 512a, 512b and the ventilation space 520 and another part 11 (11B) including the buffer spaces 512c-512f are obtained but are not used.

2. Variations

Note that the embodiment described above is only an example of the present disclosure and should not be construed as limiting. Rather, the embodiment may be readily modified in various manners depending on a design choice or any other factor without departing from the scope of the present disclosure. Next, variations of the embodiment described above will be enumerated one after another.

2.1. First Variation

Figure 24:
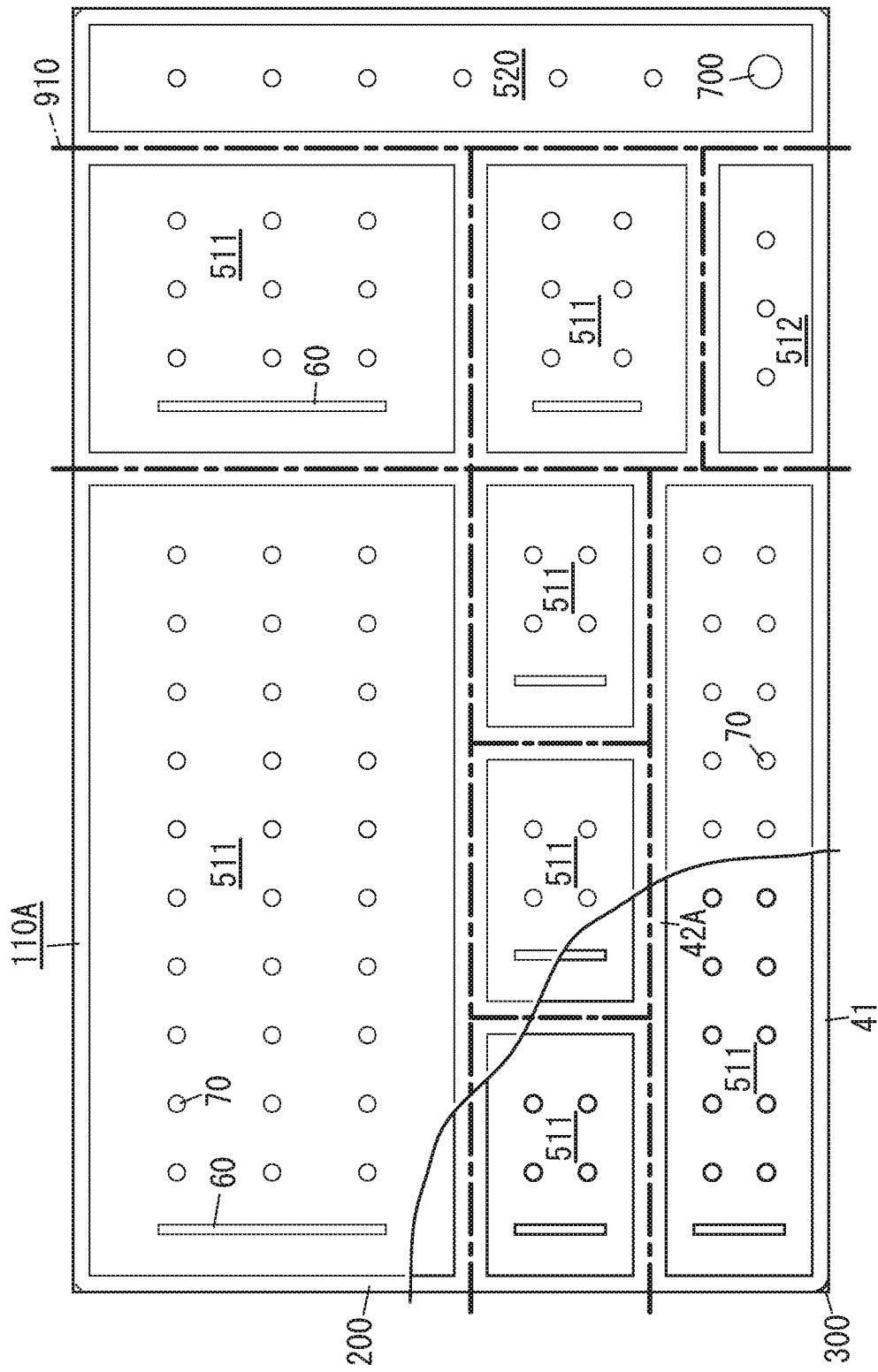
FIG. 24 is a plan view of a work in progress of a glass panel unit according to a first variation.

FIG. 24 illustrates a work in progress 110A of glass panel units according to a first variation. As shown in FIG. 24, the work in progress 110A of glass panel units according to this first variation has the same configuration as the work in progress 110 except the boundary walls 42A, which are different from the boundary walls 42 of the work in progress 110. The boundary walls 42A hermetically separate the internal space 500, surrounded with the pair of glass substrates 200, 300 and the peripheral wall 41, into a plurality of (e.g., seven in the example illustrated in FIG. 24) evacuation spaces 511, a buffer space 512, and a ventilation space 520. In this first variation, the boundary walls 42A hermetically separate the plurality of evacuation spaces 511, the buffer space 512, and the ventilation space 520 on an individual basis. The plurality of evacuation spaces 511 for use as the glass panel units each have a quadrangular shape in a plan view but do not have the same dimensions or shapes. In this work in progress 110A, the evacuation spaces 511 and the buffer space 512 have a lower internal pressure than the ventilation space 520 (e.g., may be in a vacuum condition). Also, a predetermined part, excluding the buffer space 512 and the ventilation space 520 but including the evacuation spaces 511, of the work in progress 110A forms glass panel units. In this work in progress 110A, the plurality of pillars 70 are placed over the entire internal space 500 (i.e., including the seven evacuation spaces 511, the buffer space 512, and the ventilation space 520). That is to say, the plurality of pillars 70 are placed over the evacuation spaces 511, the buffer space 512, and the ventilation space 520. Meanwhile, the gas adsorbent 60 is arranged only in each of the evacuation spaces 511. That is to say, the gas adsorbents 60 are arranged in the evacuation spaces 511, not in the buffer space 512 or the ventilation space 520.

Figure 25:
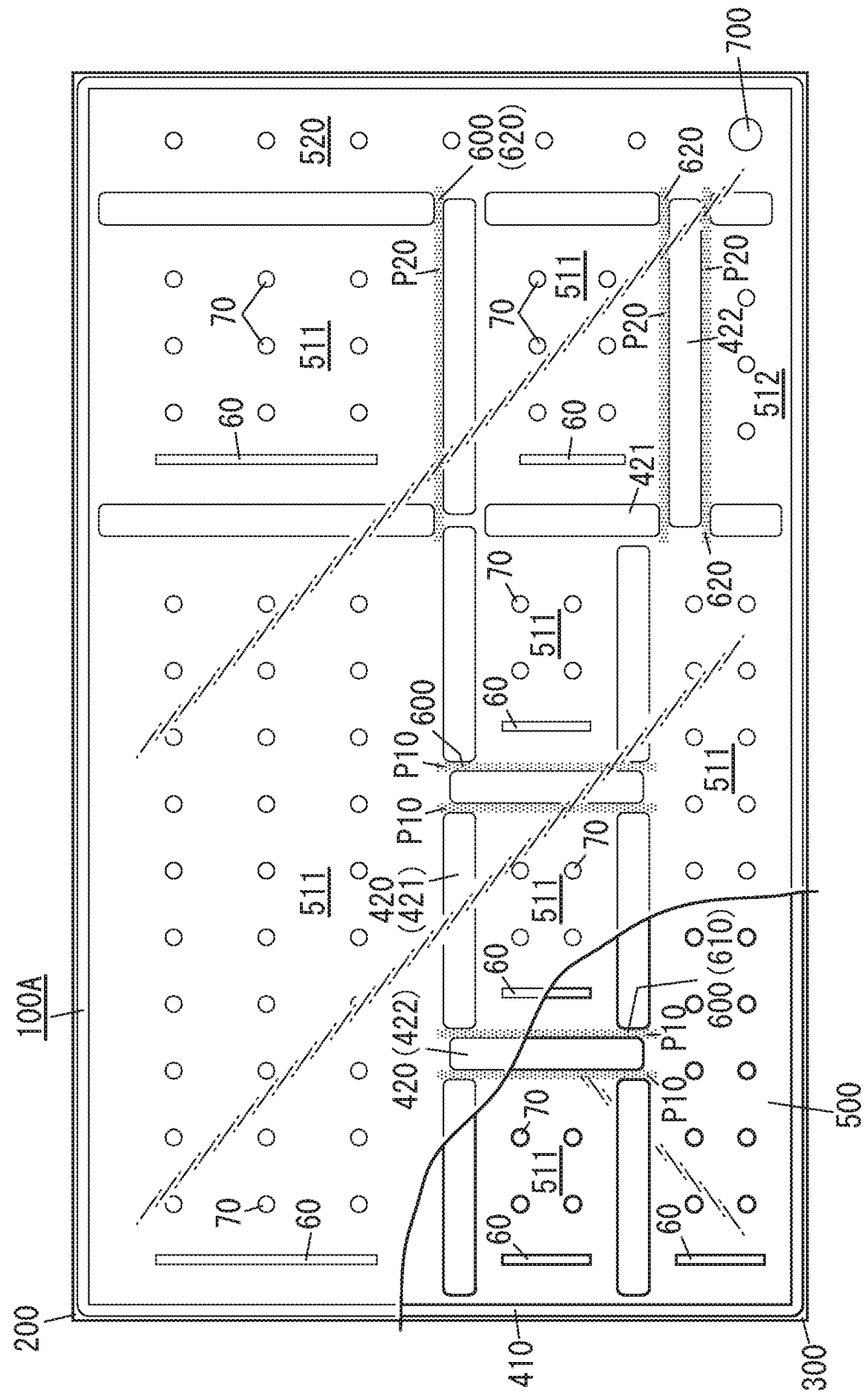
FIG. 25 is a plan view of a glass panel unit assembly according to the first variation.

The work in progress 110A may be obtained from the glass panel unit assembly 100A shown in FIG. 25. Just like the assembly 100, the assembly 100A also includes: a pair of glass substrates 200, 300; a peripheral wall 410; a plurality of partitions 420; a plurality of air passages 600; an evacuation port 700; gas adsorbents 60; and pillars 70.

Figure 26:
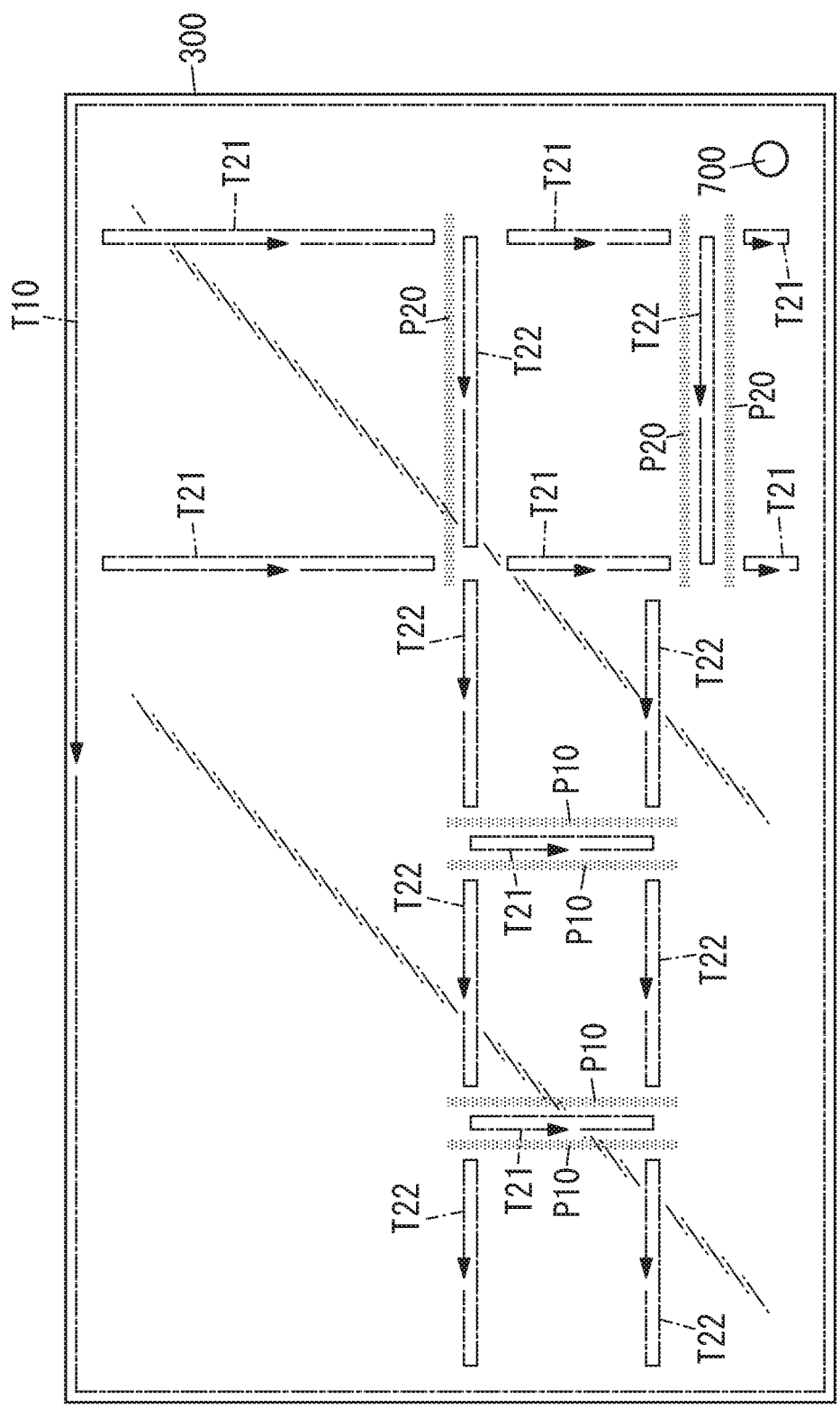
FIG. 26 illustrates how to perform a preparatory step (assembling step) in a method for manufacturing a glass panel unit according to the first variation.

The plurality of partitions 420 is provided to form boundary walls 42A. Thus, the plurality of partitions 420 partitions the internal space 500 into a plurality of (e.g., seven in the example illustrated in FIG. 25) evacuation spaces 511, a buffer space 512, and a ventilation space 520. As shown in FIG. 25, the plurality of partitions 420 includes a plurality of (e.g., eight in the example illustrated in FIG. 25) first partitions 421 and a plurality of (e.g., eight in the example illustrated in FIG. 25) second partitions 422. Note that the peripheral wall 410 and the partitions 420 may be formed by the same techniques as the ones adopted in the embodiment described above. For example, to form the peripheral wall 410, as in the peripheral wall forming step of the embodiment described above, the dispenser 810 may be moved along the peripheral edges of the second glass substrate 300 and along the path T10 shown in FIG. 26 while discharging the material M10 through the nozzle 811. In the same way, to form the partitions 420, as in the partition forming step of the embodiment described above, the dispenser 820 may be moved along the sides of the quadrangle and along the paths T21 and T22 shown in FIG. 26 while discharging the material M20 through the nozzle 821. At this time, a swollen portion 425 may be provided at an end 423 of each partition 420 as in the embodiment described above.

The plurality of air passages 600 is used to evacuate the first space (including the evacuation spaces 511 and the buffer space 512) through the evacuation port 700. Through the plurality of air passages 600, the evacuation spaces 511 and the buffer space 512 are connected (either directly or indirectly) to the ventilation space 520. In FIG. 25, the peripheral wall 410 and the partitions 420 are arranged out of contact with each other. In addition, each of the gaps between the peripheral wall 410 and the partitions 420 constitutes one of the air passages 600. Each of these air passages 600 is closed by melting and deforming an associated one of the partitions 420 once. This allows at least the evacuation spaces 511 to be (hermetically) separated from each other and also allows the evacuation spaces 511 and the buffer space 512 to be (hermetically) separated from the ventilation space 520.

The plurality of air passages 600 includes a plurality of (first) particular air passages 610 which are arranged in the second direction perpendicular to the first direction in which the pair of glass substrates 200, 300 face each other. The plurality of first particular air passages 610 constitute (first) ventilation paths P10 running through the internal space 500 in the second direction (i.e., the upward/downward direction in FIG. 25). The plurality of air passages 600 further includes (second) particular air passages 620 which are arranged in the third direction perpendicular to the first direction and intersecting with the second direction. The plurality of second particular air passages 620 constitute (second) ventilation paths P20 running through the internal space 500 in the third direction (i.e., the rightward/leftward direction in FIG. 25). Note that in FIG. 25, the ventilation paths P10, P20 are shaded just for the purpose of making the description more easily understandable.

As can be seen, the assembly 100A includes the plurality of first ventilation paths P10 running in the second direction and the plurality of second ventilation paths P20 running in the third direction as shown in FIG. 25. This allows the assembly 100A to pass not only hot air blowing in the second direction but also hot air blowing in the third direction as well. This causes the heat to be conducted more efficiently through the partitions 420 in the internal space 500 of the assembly 100A, thus facilitating heating the partitions 420. This allows unnecessary components such as a binder included in the material (second sealant) for the partitions 420 which often emit a gas to be removed sufficiently through the first melting step.

2.2. Second Variation

Figure 27:
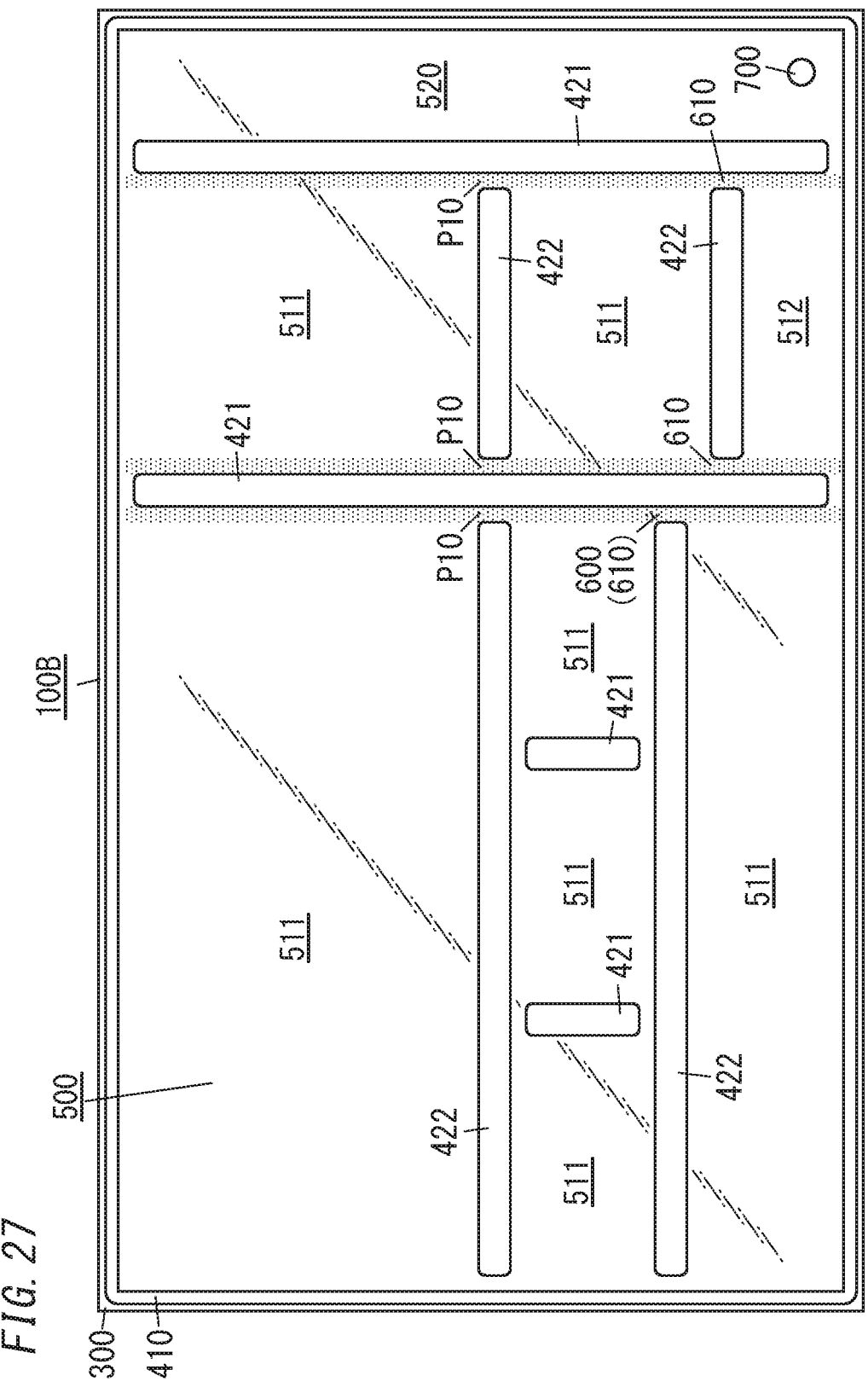
FIG. 27 is a plan view of a glass panel unit assembly according to a second variation.

FIG. 27 illustrates a glass panel unit assembly 100B according to a second variation. The assembly 100B, as well as the assembly 100A, may also be used to form the work in progress 110A of glass panel units according to the first variation shown in FIG. 24.

Just like the assembly 100A, the assembly 100B also includes: a pair of glass substrates 200, 300; a peripheral wall 410; a plurality of partitions 420; a plurality of air passages 600; an evacuation port 700; gas adsorbents 60; and pillars 70. Note that in FIG. 27, illustration of the gas adsorbents 60 and the pillars 70 is omitted just for the sake of simplicity.

Figure 28:
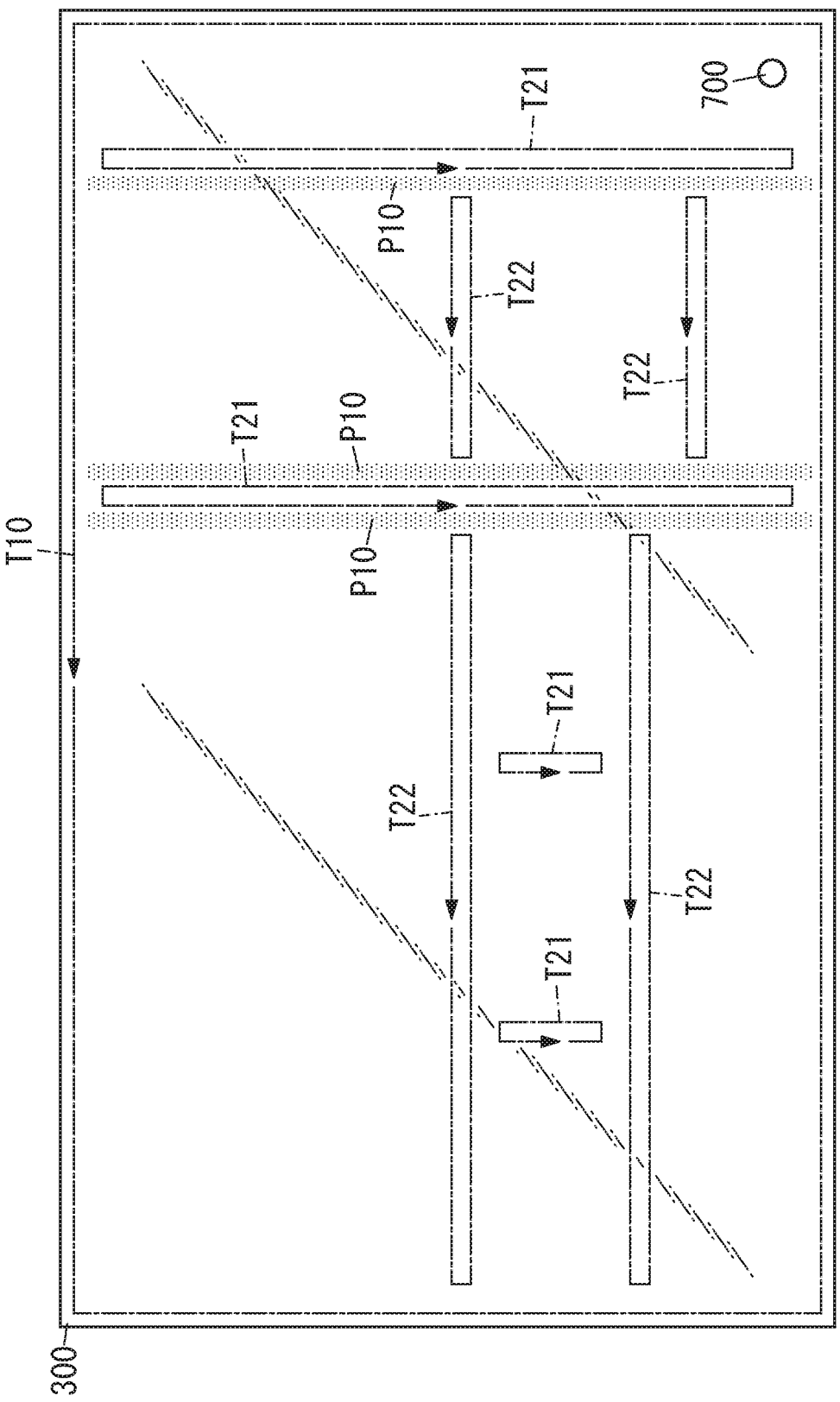
FIG. 28 illustrates how to perform a preparatory step (assembling step) in a method for manufacturing a glass panel unit according to the second variation.

The plurality of partitions 420 is provided to form boundary walls 42A. Thus, the plurality of partitions 420 partitions the internal space 500 into a plurality of (e.g., seven in the example illustrated in FIG. 27) evacuation spaces 511, a buffer space 512, and a ventilation space 520. As shown in FIG. 27, the plurality of partitions 420 includes a plurality of (e.g., four in the example illustrated in FIG. 27) first partitions 421 and a plurality of (e.g., four in the example illustrated in FIG. 27) second partitions 422. Note that the peripheral wall 410 and the partitions 420 may be formed by the same techniques as the ones adopted in the embodiment described above. For example, to form the peripheral wall 410, as in the peripheral wall forming step of the embodiment described above, the dispenser 810 may be moved along the peripheral edges of the second glass substrate 300 and along the path T10 shown in FIG. 28 while discharging the material M10 through the nozzle 811. In the same way, to form the partitions 420, as in the partition forming step of the embodiment described above, the dispenser 820 may be moved along the sides of the quadrangle and along the paths T21 and T22 shown in FIG. 28 while discharging the material M20 through the nozzle 821. At this time, a swollen portion 425 may be provided at an end 423 of each partition 420 as in the embodiment described above.

The plurality of air passages 600 is used to evacuate the first space (including the evacuation spaces 511 and the buffer space 512) through the evacuation port 700. Through the plurality of air passages 600, the evacuation spaces 511 and the buffer space 512 are connected (either directly or indirectly) to the ventilation space 520. In FIG. 27, the peripheral wall 410 and the partitions 420 are arranged out of contact with each other. In addition, each of the gaps between the peripheral wall 410 and the partitions 420 constitutes one of the air passages 600. Each of these air passages 600 is closed by melting and deforming an associated one of the partitions 420 once. This allows at least the evacuation spaces 511 to be (hermetically) separated from each other and also allows the evacuation spaces 511 and the buffer space 512 to be (hermetically) separated from the ventilation space 520.

The plurality of air passages 600 includes a plurality of particular air passages 610 which are arranged in the second direction perpendicular to the first direction in which the pair of glass substrates 200, 300 face each other. The plurality of particular air passages 610 constitute ventilation paths P10 running through the internal space 500 in the second direction (i.e., the upward/downward direction in FIG. 27). Note that in FIG. 27, the ventilation paths P10 are shaded just for the purpose of making the description more easily understandable.

As can be seen, the assembly 100B includes the plurality of ventilation paths P10 running in the second direction as shown in FIG. 27. This allows unnecessary components such as a binder included in the material (second sealant) for the partitions 420 which often emit a gas to be removed through the first melting step as sufficiently as in the embodiment described above. In addition, even though the assembly 100B includes a smaller number of partitions 420 than the assembly 100A, the same work in progress 110A (see FIG. 24) as that of the assembly 100A may be obtained from the assembly 100B.

2.3. Third Variation

Figure 29:
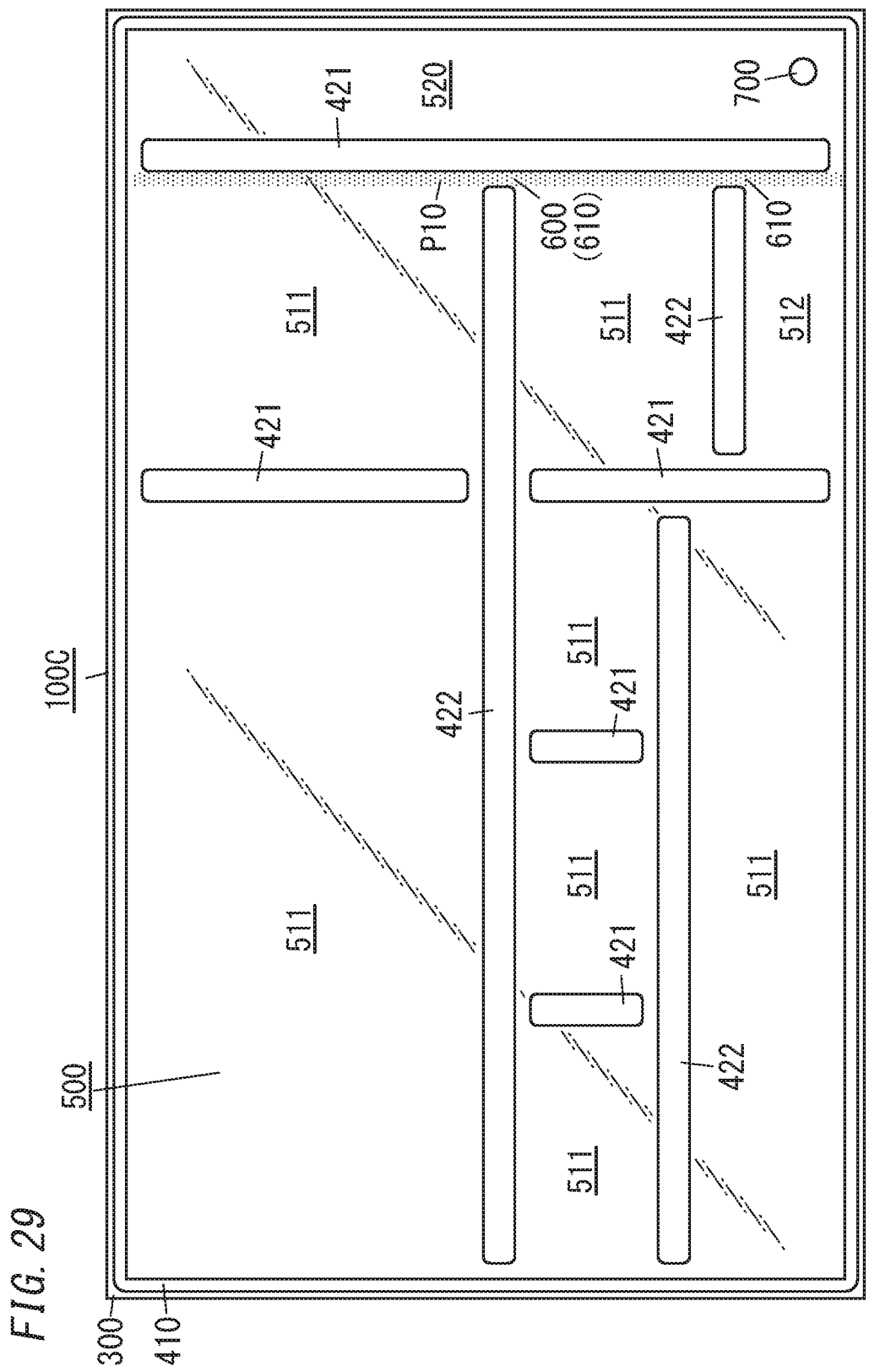
FIG. 29 is a plan view of a glass panel unit assembly according to a third variation.

FIG. 29 illustrates a glass panel unit assembly 100C according to a third variation. The assembly 100C, as well as the assemblies 100A, 100B, may also be used to form the work in progress 110A of glass panel units according to the first variation shown in FIG. 24.

Just like the assemblies 100A, 100B, the assembly 100C also includes: a pair of glass substrates 200, 300; a peripheral wall 410; a plurality of partitions 420; a plurality of air passages 600; an evacuation port 700; gas adsorbents 60; and pillars 70. Note that in FIG. 29, illustration of the gas adsorbents 60 and the pillars 70 is omitted just for the sake of simplicity.

Figure 30:
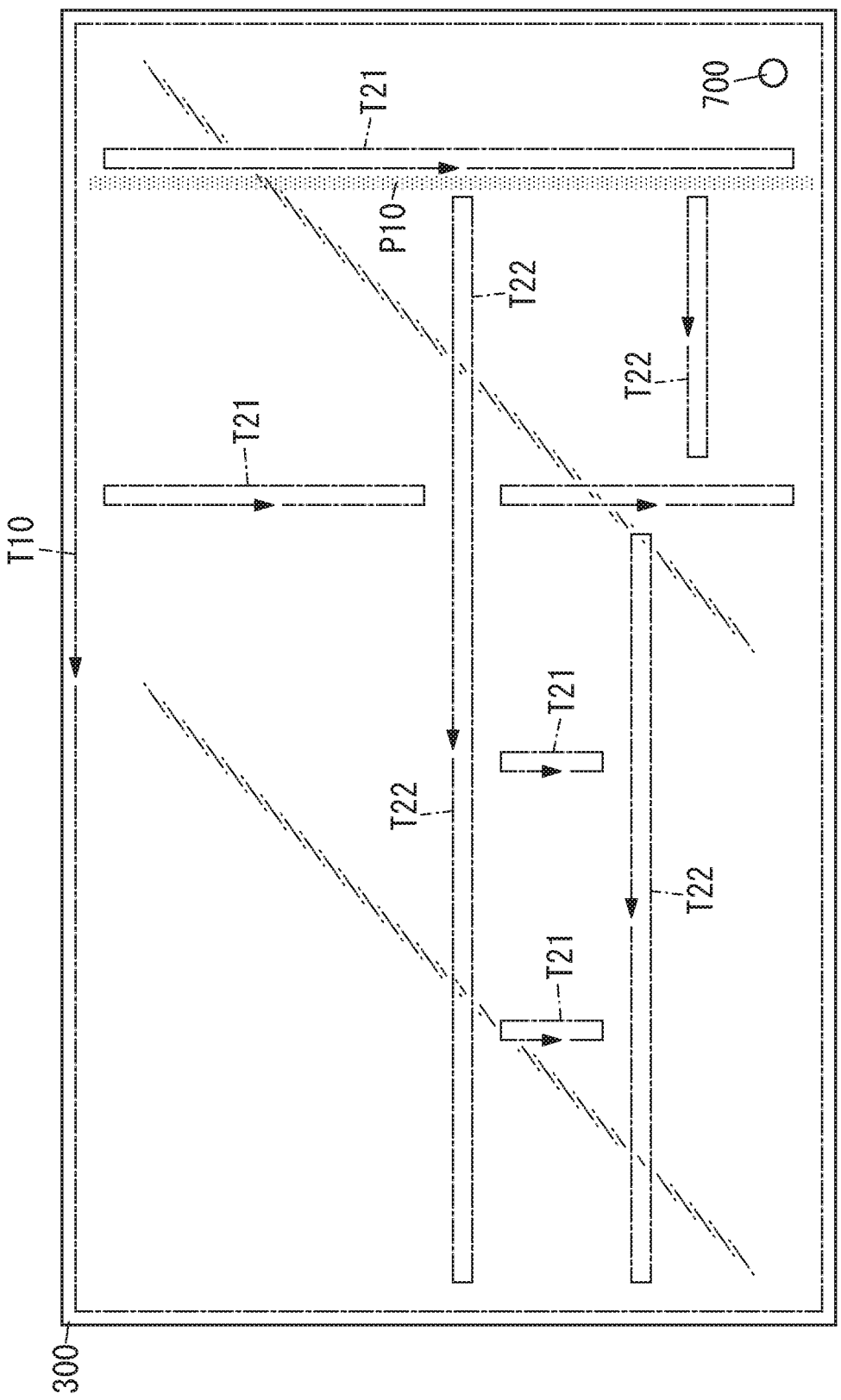
FIG. 30 illustrates how to perform a preparatory step (assembling step) in a method for manufacturing a glass panel unit according to the third variation.

The plurality of partitions 420 is provided to form boundary walls 42A. Thus, the plurality of partitions 420 partitions the internal space 500 into a plurality of (e.g., seven in the example illustrated in FIG. 29) evacuation spaces 511, a buffer space 512, and a ventilation space 520. As shown in FIG. 29, the plurality of partitions 420 includes a plurality of (e.g., five in the example illustrated in FIG. 29) first partitions 421 and a plurality of (e.g., three in the example illustrated in FIG. 29) second partitions 422. Note that the peripheral wall 410 and the partitions 420 may be formed by the same techniques as the ones adopted in the embodiment described above. For example, to form the peripheral wall 410, as in the peripheral wall forming step of the embodiment described above, the dispenser 810 may be moved along the peripheral edges of the second glass substrate 300 and along the path T10 shown in FIG. 28 while discharging the material M10 through the nozzle 811. In the same way, to form the partitions 420, as in the partition forming step of the embodiment described above, the dispenser 820 may be moved along the sides of the quadrangle and along the paths T21 and T22 shown in FIG. 30 while discharging the material M20 through the nozzle 821. At this time, a swollen portion 425 may be provided at an end 423 of each partition 420 as in the embodiment described above.

The plurality of air passages 600 is used to evacuate the first space (including the evacuation spaces 511 and the buffer space 512) through the evacuation port 700. Through the plurality of air passages 600, the evacuation spaces 511 and the buffer space 512 are connected (either directly or indirectly) to the ventilation space 520. In FIG. 29, the peripheral wall 410 and the partitions 420 are arranged out of contact with each other. In addition, each of the gaps between the peripheral wall 410 and the partitions 420 constitutes one of the air passages 600. Each of these air passages 600 is closed by melting and deforming an associated one of the partitions 420 once. This allows at least the evacuation spaces 511 to be (hermetically) separated from each other and also allows the evacuation spaces 511 and the buffer space 512 to be (hermetically) separated from the ventilation space 520.

The plurality of air passages 600 includes a plurality of particular air passages 610 which are arranged in the second direction perpendicular to the first direction in which the pair of glass substrates 200, 300 face each other. The plurality of particular air passages 610 constitute a ventilation path P10 running through the internal space 500 in the second direction (i.e., the upward/downward direction in FIG. 29). Note that in FIG. 29, the ventilation path P10 is shaded just for the purpose of making the description more easily understandable.

As can be seen, the assembly 100C includes the ventilation path P10 running in the second direction as shown in FIG. 29. This allows unnecessary components such as a binder included in the material (second sealant) for the partitions 420 which often emit a gas to be removed through the first melting step as sufficiently as in the embodiment described above. In addition, even though the assembly 100C includes a smaller number of partitions 420 than the assembly 100A, the same work in progress 110A (see FIG. 24) as that of the assembly 100A may be obtained from the assembly 100C.

2.4. Fourth Variation

Figure 31:
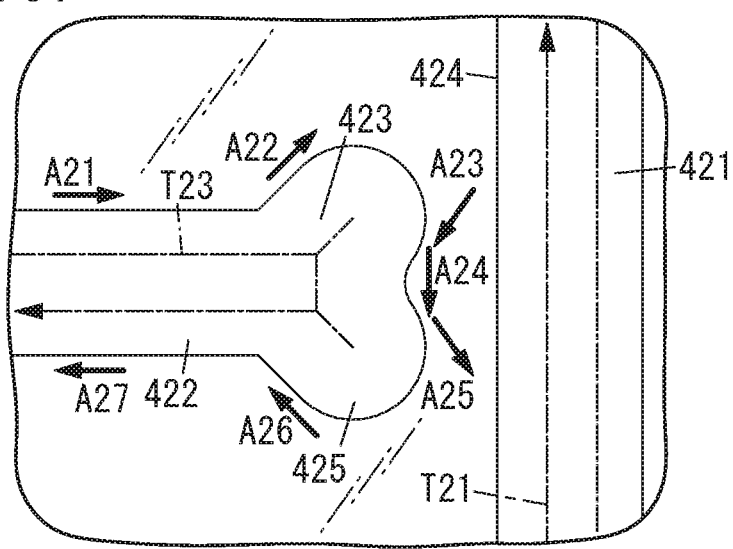
FIG. 31 illustrates a glass panel unit assembly according to a fourth variation.

A glass panel unit assembly according to a fourth variation includes partitions 420 (in particular, the second partitions 422) having a different shape as shown in FIG. 31 from their counterparts of the embodiment described above. FIG. 31 illustrates a state where the plurality of partitions 420 includes a first partition 421 and a second partition 422, of which the lengths are defined in two different directions. In this variation, one end 423 of the second partition 422 faces a side portion 424 of the first partition 421 with a predetermined gap left between them. The air passage 600 is a space between the end 423 of the second partition 422 and the side portion 424 of the first partition 421. As shown in FIG. 31, the second partition 422 has, at the end 423 thereof, a swollen portion 425 protruding toward both ends along the width of the second partition 422 (i.e., in the upward/downward direction shown in FIG. 31). More specifically, the swollen portion 425 has portions obliquely protruding from the end 423 toward both ends along the width of the second partition 422. That is to say, the swollen portion 425 shown in FIG. 31 has a so-called "heart shape."

This swollen portion 425 also makes the angle formed by the corner portion C10 closer to the angle of intersection between the first partition 421 and the second partition 422 (e.g., 90 degrees in this embodiment) as shown in FIG. 13. This curbs a decline in the strength at a connecting portion between regions S10, S20 defined by the partitions 421, 422 and a decline in appearance. Optionally, the swollen portion 425 may be provided for each of both ends 423 of the partition 421. This curbs a decline in the strength at a connecting portion between the boundary wall 42 and the peripheral wall 41 and a decline in the appearance. In addition, the swollen portion 425 according to this variation, as well as the swollen portion 425 of the embodiment described above, may protrude toward the evacuation space 511 at least along the width of the second partition 422.

The swollen portion 425 shown in FIG. 31 may be formed by moving the dispenser 820 along the path T23 while discharging the material M20 through the nozzle 821. The path T23 includes sections for forming the swollen portion 425 (as indicated by the arrows A21, A23, A25, A26). That is to say, moving the dispenser 820 along the path T23 as indicated by the arrows A21-A27 allows a partition 422 having the swollen portion 425 at the end 423 to be formed. Note that the rate of applying the material M20 through the dispenser 820 may be constant.

As can be seen, the shape of the swollen portion 425 is not particularly limited as long as the swollen portion 425 protrudes toward both ends along the width of the second partition 422. Optionally, the swollen portion 425 may be provided as needed for any partition 420, no matter whether it is the first partition 421 or the second partition 422. For example, the end 423 of a partition 420 may face the peripheral wall 410 with a predetermined gap left between them and an air passage 600 may be a space between the end 423 of the partition 420 and the peripheral wall 410. In that case, the partition 420 may include, at the end 423 thereof, the swollen portion 425 protruding toward the evacuation space 511 at least along the width of the partition 420. In particular, the partition 420 may include, at the end 423 thereof, a swollen portion 425 protruding toward both ends along the width of the partition 420.

2.5. Fifth Variation

Figure 32:
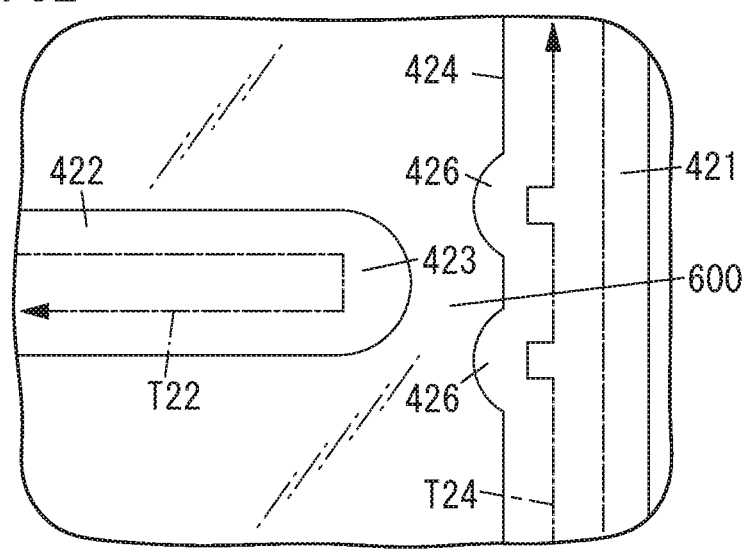
FIG. 32 illustrates a glass panel unit assembly according to a fifth variation.

A glass panel unit assembly according to a fifth variation includes partitions 420 (in particular, a first partition 421)

having a different shape as shown in FIG. 32 from the counterparts of the embodiment described above. FIG. 32 illustrates a state where the plurality of partitions 420 includes a first partition 421 and a second partition 422, of which the lengths are defined in two different directions. In addition, the second partition 422 is supposed to be located between the evacuation spaces 511. In this variation, the end 423 of the second partition 422 faces the side portion 424 of the first partition 421 with a predetermined gap left between them. The air passage 600 is the space between the end 423 of the second partition 422 and the side portion 424 of the first partition 421. In addition, the first partition 421 includes a pair of protrusions 426 protruding from the side portion 424 of the first partition 421 such that the pair of protrusions 426 are located on both sides of the end 423 of the second partition 422 along the width of the second partition 422 (i.e., in the upward/downward direction in FIG. 32). Each of these protrusions 426 has a width decreasing as the distance to the second partition 422 decreases. Each of these protrusions 426 has a so-called arc shape. As can be seen, the first partition 421 has a pair of protrusions 426 protruding from the side portion 424 of the first partition 421 toward the end 423 of the second partition 422. In addition, in FIG. 32, the second partition 422 is located between the evacuation spaces 511. Therefore, each of the pair of protrusions 426 faces the end 423 of the second partition 422 and is located closer to associated one of the evacuation spaces 511 than the second partition 422 is. That is to say, in FIG. 32, the upper protrusion 426 is located closer to the upper evacuation space 511 than the second partition 422 is, and the lower protrusion 426 is located closer to the lower evacuation space 511 than the second partition 422 is. As used herein, if a protrusion 426 is located closer to its associated evacuation space 511 than the second partition 422 is, then it means that the center axis of the protrusion 426 is located closer to the evacuation space 511 than the center axis of the second partition 422 is. For example, the center axis of the protrusion 426 may be an axis aligned with a line that divides the protrusion 426 into two along the width thereof. Likewise, the center axis of the second partition 422 may be an axis aligned with a line that divides the second partition 422 into two along the width thereof. In the variation illustrated in FIG. 32, the center axis of the second partition 422 is located between the respective center axes of the pair of protrusions 426.

These protrusions 426, as well as the swollen portion 425, are also able to make the angle defined by the corner portion C10 closer to the angle of intersection (e.g., 90 degrees in this embodiment) between the first partition 421 and the second partition 422 as shown in FIG. 13. This curbs a decline in the strength at a connecting portion between regions S10, S20 defined by the partitions 421, 422 and a decline in appearance. Optionally, at least one of the pair of protrusions 426 may be located closer to an associated evacuation space 511 than the second partition 422 is. For example, if the second partition 422 is located between an evacuation space 511 and another type of space (which may be either the buffer space 512 or the ventilation space 520), then one of the pair of protrusions 426 is located closer to the evacuation space 511 than the second partition 422 is. That is to say, at least one of the one or more protrusions 426 needs to face the end 423 of the second partition 422 and be located closer to the evacuation space 511 than the second partition 422 is. In that case, the first partition 421 may have only the protrusion 426 that is located closer to the evacuation space 511 than the second partition 422 is. This is because as for the spaces other than the evacuation spaces 511, a decline in the strength of the boundary walls 42 is not a significant problem.

Figure 33:
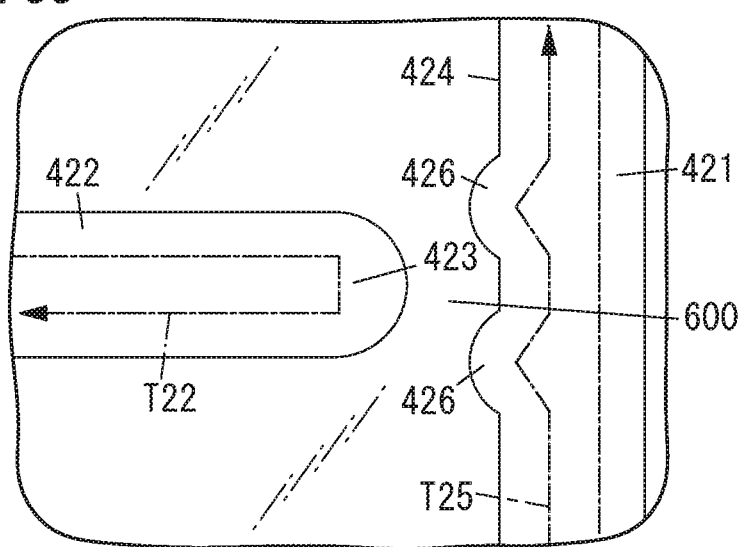
FIG. 33 illustrates the glass panel unit assembly according to the fifth variation.

The protrusions 426 may be formed by moving the dispenser 820 along the path T24 while discharging the material M20 through the nozzle 821. The path T24 includes three paths along three sides of a rectangle to be formed to come temporarily closer toward the end 423 of the partition 422 to form the protrusion 426. That is to say, the application step includes forming the pair of protrusions 426 by locally bringing the dispenser 820 closer toward the end 423 of the second partition 422 while applying the material M20 along a longer side of the first partition 421. Alternatively, the protrusions 426 may also be formed by moving the dispenser 820 along the path T25 shown in FIG. 33 while discharging the material M20 through the nozzle 821. The path T25 includes three paths along three sides of a rectangle to be formed to come temporarily closer toward the end 423 of the partition 422 to form the protrusions 426. That is to say, the application step includes forming the pair of protrusions 426 by locally bringing the dispenser 820 closer toward the end 423 of the second partition 422 while applying the material M20 along a longer side of the first partition 421.

The shape of the protrusions 426 is not particularly limited as long as the protrusions 426 protrude toward the end 423 of the partition 422. In addition, the protrusions 426 need to protrude toward the end 423 of the partition 422 and do not have to overlap with the end 423 along the length of the partition 422. Optionally, the protrusion 426 may be provided as needed for any partition 420 no matter whether the partition 420 is the first partition 421 or the second partition 422. Also, in the fifth variation, the second partition 422 has no swollen portion 425. However, in this fifth variation, the second partition 422 may also have the swollen portion 425 at the end 423 thereof.

Optionally, the protrusion 426 may also be provided for the peripheral wall 410. For example, the end 423 of the partition 422 may face the peripheral wall 410 with a predetermined gap left between them, and the air passage 600 may be the space between the end 423 of the partition 420 and the peripheral wall 410. In that case, the peripheral wall 410 may include one or more protrusions 426 protruding toward the end 423 of the partition 420. In addition, at least one of the one or more protrusions 426 needs to face the end 423 of the partition 420 and needs to be located closer to the evacuation space 511 than the partition 420 is. In particular, the peripheral wall 410 may include a pair of protrusions 426 protruding such that the pair of protrusions 426 are located on both sides of the end 423 of the partition 420 along the width of the partition 420. Note that the protrusions 426 need to protrude toward the end 423 of the partition 420 in question and do not have to overlap with the end 423 along the length of the partition 422. Even in this variation, the partition 420 may also have the swollen portion 425 at the end 423 thereof.

2.6. Other Variations

In the embodiment described above, the glass panel units 10 have a rectangular shape. However, this is only an example and should not be construed as limiting. Alternatively, the glass panel units 10 may also have a circular, polygonal, or any other desired shape. That is to say, the first glass panel 20, the second glass panel 30, and the frame member 40 do not have to be rectangular but may also have a circular, polygonal, or any other desired shape. In addition, the respective shapes of the first glass substrate 200, the second glass substrate 300, the peripheral wall 410, and the partitions 420 do not have to be the ones used in the embodiment described above, but may also be any other shapes that allow glass panel units 10 of a desired shape to be obtained. Note that the shape and dimensions of the glass panel units 10 may be determined according to the intended use of the glass panel units 10.

The pair of glass panels 20, 30 does not have to have the same planar shape and planar dimensions and does not have to have the same thickness, either. In addition, the pair of glass panels 20, 30 does not have to be made of the same material, either. The same statement applies to the pair of glass substrates 200, 300 as well.

The frame member 40 does not have to have the same planar shape as the pair of glass panels 20, 30. Likewise, the peripheral wall 41, 410 does not have to have the same planar shape as the pair of glass substrates 200, 300, either.

The first sealant of the peripheral wall 410 (peripheral wall 41) and the second sealant of the partitions 420 (boundary walls 42) do not need to include the same core material but may include mutually different core materials. Furthermore, the first sealant may consist essentially of a hot glue. Likewise, the second sealant may also consist essentially of a hot glue.

Also, in the assembly 100, the peripheral wall 410 is just provided between the pair of glass substrates 200, 300 and does not bond the pair of glass substrates 200, 300 together. Optionally, however, in the assembly 100 stage, the peripheral wall 410 may bond the pair of glass substrates 200, 300 together. In short, in the assembly 100, the peripheral wall 410 needs to be provided between the pair of glass substrates 200, 300 and does not have to bond the pair of glass substrates 200, 300 together.

Furthermore, in the embodiment described above, the air passages 600 are the gaps between the partitions 420 and the gaps between the partitions 420 and the peripheral wall 410. However, this is only an example and should not be construed as limiting. Alternatively, the air passages 600 may also be through holes cut through the partitions 420. Still alternatively, the air passages 600 may also be gaps left between the partitions 420 and the first glass substrate 200.

Furthermore, in the embodiment described above, the internal space 500 is partitioned into the plurality of evacuation spaces 511, the plurality of buffer spaces 512, and the single ventilation space 520. However, the internal space 500 may be partitioned by the partitions into one or more evacuation spaces 511, one or more buffer spaces 512, and one or more ventilation spaces 520. Note that the buffer space 512 is not an essential constituent element.

In the embodiment described above, a melting furnace is used to heat the peripheral wall 410, the gas adsorbents 60, and the partitions 420. However, heating may be conducted by any appropriate heating means. The heating means may be a laser beam or a heat exchanger plate connected to a heat source, for example.

In the embodiment described above, the assembly 100 includes a plurality of air passages 600. However, the number of the air passages 600 provided may be one or more. The shape of the air passages 600 is not particularly limited. Furthermore, the assembly 100 needs to include at least one ventilation path P10 and does not have to include a plurality of ventilation paths P10. Furthermore, the ventilation path P10 does not have to extend along the width of the pair of glass substrates 200, 300 but may extend along the length thereof. In short, the ventilation path P10 may extend in any direction perpendicular to the direction in which the pair of glass substrates 200, 300 face each other. Note that the ventilation path P10 is not an essential constituent element.

In the embodiment described above, the evacuation port 700 is cut through the second glass substrate 300. However, this is only an example and should not be construed as limiting. Alternatively, the evacuation port 700 may be cut through the first glass substrate 200 or may also be cut through the peripheral wall 410 (peripheral wall 41). In short, the evacuation port 700 just needs to be provided to connect the ventilation space 520 to the external environment.

In the embodiment described above, each glass panel unit 10 includes a single gas adsorbent 60. However, the number of the gas adsorbent 60 provided is not particularly limited. Optionally, the glass panel unit 10 may include no gas adsorbent 60 as well. If necessary, the gas adsorbent 60 may be provided in the buffer spaces 512 and the ventilation space 520. Furthermore, the getter of the gas adsorbent 60 is an evaporative getter in the embodiment described above. Alternatively, the getter may also be a non-evaporative getter.

In the embodiment described above, the gas adsorbent 60 has an elongate flat plate shape. However, the gas adsorbent 60 may also have any other shape. In addition, the gas adsorbent 60 does not have to be located at an end of an evacuation space 511. Furthermore, in the embodiment described above, the gas adsorbent 60 is formed by applying a liquid including a powder of a getter (such as a dispersion liquid obtained by dispersing the powder of the getter in a liquid or a solution obtained by dissolving the powder of the getter in a liquid). However, this is only an example and should not be construed as limiting. Alternatively, the gas adsorbent 60 may include a substrate and a getter adhered to the substrate. Such a gas adsorbent 60 may be obtained by immersing the substrate in a liquid including a powder of the getter and drying the substrate. Note that the substrate may have any desired shape and may have an elongate rectangular shape, for example. Still alternatively, the gas adsorbent 60 may also be a film formed to cover the surface of the second glass substrate 300 either entirely or only partially. Such a gas adsorbent 60 may be obtained by coating the surface of the second glass substrate 300 with a liquid including a powder of the getter. Yet alternatively, the gas adsorbent 60 may be included in the pillars 70. The pillars 70 including the gas adsorbent 60 may be obtained by making the pillars 70 of a material containing the getter. Alternatively, the gas adsorbent 60 may even be a solid matter made of the getter.

Furthermore, in the embodiment described above, the plurality of pillars 70 are placed over the entire internal space 500 (i.e., in each of the evacuation spaces 511, the buffer spaces 512, and the ventilation space 520). However, the pillars 70 do not have to be placed in the buffer spaces 512 and the ventilation space 520. Furthermore, in the embodiment described above, each glass panel unit 10 includes a plurality of pillars 70. Alternatively, each glass panel unit 10 may include a single pillar 70. Still alternatively, the glass panel unit 10 may include no pillars 70 at all.

In the embodiment described above, the evacuation spaces 511 and the buffer spaces 512 are in a vacuum condition. However, the vacuum condition does not need to be created there but a pressure reduced condition may be produced there. As used herein, the "pressure reduced condition" refers to a condition in which the pressure is lower than the atmospheric pressure.

3. Aspects

As can be seen from the foregoing description of the exemplary embodiment and its variations, the present disclosure has the following aspects. In the following description, reference signs are added in parentheses to the respective constituent elements solely for the purpose of clarifying the correspondence between those aspects of the present disclosure and the exemplary embodiment described above.

A glass panel unit assembly (100; 100A; 100B; 100C) according to a first aspect includes: a pair of glass substrates (200, 300) arranged to face each other; and a peripheral wall (410) having a frame shape and disposed between the pair of glass substrates (200, 300). The assembly (100; 100A; 100B; 100C) further includes a plurality of partitions (420) to partition an internal space (500), surrounded with the pair of glass substrates (200, 300) and the peripheral wall (410), into an evacuation space (511) and a ventilation space (520). The assembly (100; 100A; 100B; 100C) further includes: an evacuation port (700) connecting the ventilation space (520) to an external environment; and an air passage (600) to evacuate the evacuation space (511) through the evacuation port (700). The plurality of partitions (420) includes a first partition (421) and a second partition (422), of which lengths are defined in two different directions. An end (423) of the second partition (422) faces a side portion (424) of the first partition (421) with a predetermined gap left between the first partition (421) and the second partition (422). The air passage (600) is a space between the end (423) of the second partition (422) and the side portion (424) of the first partition (421). The second partition (422) includes, at the end (423) thereof, a swollen portion (425) protruding toward the evacuation space (511) at least along width of the second partition (422). The first aspect contributes to increasing the production yield of glass panel units (10).

A glass panel unit assembly (100; 100A; 100B; 100C) according to a second aspect may be implemented in combination with the first aspect. In the second aspect, the swollen portion (425) protrudes toward both ends along the width of the second partition (422). The second aspect contributes to increasing the production yield of glass panel units (10).

A glass panel unit assembly (100; 100A; 100B; 100C) according to a third aspect may be implemented in combination with the second aspect. In the third aspect, the swollen portion (425) has a spherical shape. The third aspect contributes to increasing the production yield of glass panel units (10).

A glass panel unit assembly (100; 100A; 100B; 100C) according to a fourth aspect may be implemented in combination with the second aspect. In the fourth aspect, the swollen portion (425) includes parts obliquely protruding from the end (423) of the second partition (422) toward both ends along the width of the second partition (422). The fourth aspect contributes to increasing the production yield of glass panel units (10).

A glass panel unit assembly (100; 100A; 100B; 100C) according to a fifth aspect includes: a pair of glass substrates (200, 300) arranged to face each other; and a peripheral wall (410) having a frame shape and disposed between the pair of glass substrates (200, 300). The assembly (100; 100A; 100B; 100C) further includes a plurality of partitions (420) to partition an internal space (500), surrounded with the pair of glass substrates (200, 300) and the peripheral wall (410), into an evacuation space (511) and a ventilation space (520). The assembly (100; 100A; 100B; 100C) further includes: an evacuation port (700) connecting the ventilation space (520) to an external environment; and an air passage (600) to evacuate the evacuation space (511) through the evacuation port (700). The plurality of partitions (420) includes a first partition (421) and a second partition (422), of which lengths are defined in two different directions. An end (423) of the second partition (422) faces a side portion (424) of the first partition (421) with a predetermined gap left between the first partition (421) and the second partition (422). The air passage (600) is a space between the end (423) of the second partition (422) and the side portion (424) of the first partition (421). The first partition (421) has one or more protrusions (426) protruding from the side portion (424) of the first partition (421) toward the end (423) of the second partition (422). At least one of the one or more protrusions (426) faces the end (423) of the second partition (422) and is located closer to the evacuation space (511) than the second partition (422) is. The fifth aspect contributes to increasing the production yield of glass panel units (10).

A glass panel unit assembly (100; 100A; 100B; 100C) according to a sixth aspect may be implemented in combination with the fifth aspect. In the sixth aspect, the one or more protrusions (426) have a width decreasing as distance to the second partition (422) decreases. The sixth aspect contributes to increasing the production yield of glass panel units (10).

A glass panel unit assembly (100; 100A; 100B; 100C) according to a seventh aspect may be implemented in combination with the fifth or sixth aspect. In the seventh aspect, the one or more protrusions (426) include a pair of protrusions (426). A center axis (X20) of the second partition (422) is located between respective center axes (X10) of the pair of protrusions (426). The seventh aspect contributes to increasing the production yield of glass panel units (10).

A method for manufacturing a glass panel unit according to an eighth aspect includes an assembling step, an evacuation step, and a sealing step. The assembling step includes providing the glass panel unit assembly (100; 100A; 100B; 100C) according to any one of the first to fourth aspects. The evacuation step includes evacuating the evacuation space (511) through the air passage (600), the ventilation space (520), and the evacuation port (700). The sealing step includes deforming the plurality of partitions (420) to close the air passage (600). The eighth aspect contributes to increasing the production yield of glass panel units (10).

A method for manufacturing a glass panel unit according to a ninth aspect may be implemented in combination with the eighth aspect. In the ninth aspect, the assembling step includes an application step of applying a material (M20) for the second partition (422). The application step includes forming the swollen portion (425) by making a velocity at which the material (M20) is applied along a shorter side of the second partition (422) lower than a velocity at which the material (M20) is applied along longer sides of the second partition (422). The ninth aspect allows the swollen portion (425) to be formed easily.

A method for manufacturing a glass panel unit according to a tenth aspect includes an assembling step, an evacuation step, and a sealing step. The assembling step includes providing the glass panel unit assembly (100; 100A; 100B; 100C) according to any one of the fifth to seventh aspects. The evacuation step includes evacuating the evacuation space (511) through the air passage (600), the ventilation space (520), and the evacuation port (700). The sealing step includes deforming the plurality of partitions (420) to close the air passage (600). The tenth aspect contributes to increasing the production yield of glass panel units (10).

A method for manufacturing a glass panel unit according to an eleventh aspect may be implemented in combination with the tenth aspect. In the eleventh aspect, the assembling step includes an application step of applying a material (M20) for the first partition (421). The application step includes forming the one or more protrusions (426) by locally bringing the material (M20) applied closer toward the end (423) of the second partition (422) while applying the material (M20) along a longer side of the first partition (421). The eleventh aspect allows the protrusions (426) to be formed easily.

A method for manufacturing a glass panel unit according to a twelfth aspect may be implemented in combination with any one of the eighth to eleventh aspects. In the twelfth aspect, the sealing step includes deforming the plurality of partitions (420) while evacuating the evacuation space (511) through the air passage (600), the ventilation space (520), and the evacuation port (700). The twelfth aspect allows evacuation to be done efficiently.

A method for manufacturing a glass panel unit according to a thirteenth aspect may be implemented in combination with any one of the eighth to twelfth aspects. In the thirteenth aspect, the method for manufacturing a glass panel unit further includes a removing step. The removing step includes removing a part including the ventilation space (520) to obtain a glass panel unit (10) as a part including the evacuation space (511). The thirteenth aspect allows a glass panel unit (10) with no evacuation port (700) to be obtained.

A glass panel unit assembly (100; 100A; 100B; 100C) according to a fourteenth aspect includes: a pair of glass substrates (200, 300) arranged to face each other; and a peripheral wall (410) having a frame shape and disposed between the pair of glass substrates (200, 300). The assembly (100; 100A; 100B; 100C) further includes a partition to partition an internal space (500), surrounded with the pair of glass substrates (200, 300) and the peripheral wall (410), into an evacuation space (511) and a ventilation space (520). The assembly (100; 100A; 100B; 100C) further includes: an evacuation port (700) connecting the ventilation space (520) to an external environment; and an air passage (600) to evacuate the evacuation space (511) through the evacuation port (700). An end (423) of the partition (420) faces the peripheral wall (410) with a predetermined gap left between the partition (420) and the peripheral wall (410). The air passage (600) is a space between the end (423) of the partition (420) and the peripheral wall (410). The partition (420) includes, at the end (423) thereof, a swollen portion (425) protruding toward the evacuation space (511) at least along width of the partition (420). The fourteenth aspect contributes to increasing the production yield of glass panel units (10).

A glass panel unit assembly (100; 100A; 100B; 100C) according to a fifteenth aspect may be implemented in combination with the fourteenth aspect. In the fifteenth aspect, the swollen portion (425) protrudes toward both ends along the width of the partition (420). The fifteenth aspect contributes to increasing the production yield of glass panel units (10).

A glass panel unit assembly (100; 100A; 100B; 100C) according to a sixteenth aspect may be implemented in combination with the fifteenth aspect. In the sixteenth aspect, the swollen portion (425) has a spherical shape. The sixteenth aspect contributes to increasing the production yield of glass panel units (10).

A glass panel unit assembly (100; 100A; 100B; 100C) according to a seventeenth aspect may be implemented in combination with the fifteenth aspect. In the seventeenth aspect, the swollen portion (425) includes parts obliquely protruding from the end (423) of the partition (420) toward both ends along the width of the partition (420). The seventeenth aspect contributes to increasing the production yield of glass panel units (10).

A glass panel unit assembly (100; 100A; 100B; 100C) according to an eighteenth aspect includes: a pair of glass substrates (200, 300) arranged to face each other; and a peripheral wall (410) having a frame shape and disposed between the pair of glass substrates (200, 300). The assembly (100; 100A; 100B; 100C) further includes a partition (420) to partition an internal space (500), surrounded with the pair of glass substrates (200, 300) and the peripheral wall (410), into an evacuation space (511) and a ventilation space (520). The assembly (100; 100A; 100B; 100C) further includes: an evacuation port (700) connecting the ventilation space (520) to an external environment; and an air passage (600) to evacuate the evacuation space (511) through the evacuation port (700). An end (423) of the partition (420) faces the peripheral wall (410) with a predetermined gap left between the partition (420) and the peripheral wall (410). The air passage (600) is a space between the end (423) of the partition (420) and the peripheral wall (410). The peripheral wall (410) has one or more protrusions (426) protruding toward the end (423) of the partition (420). At least one of the one or more protrusions (426) faces the end (423) of the partition (420) and is located closer to the evacuation space (511) than the partition (420) is. The eighteenth aspect contributes to increasing the production yield of glass panel units (10).

A glass panel unit assembly (100; 100A; 100B; 100C) according to a nineteenth aspect may be implemented in combination with the eighteenth aspect. In the nineteenth aspect, the one or more protrusions (426) have a width decreasing as distance to the partition (420) decreases. The nineteenth aspect contributes to increasing the production yield of glass panel units (10).

A glass panel unit assembly (100; 100A; 100B; 100C) according to a twentieth aspect may be implemented in combination with the eighteenth or nineteenth aspect. In the twentieth aspect, the one or more protrusions (426) include a pair of protrusions (426). A center axis of the partition (420) is located between respective center axes of the pair of protrusions (426). The twentieth aspect contributes to increasing the production yield of glass panel units (10).

REFERENCE SIGNS LIST 10, 10A-10H Glass Panel Unit
100, 100A, 100B, 100C Glass Panel Unit Assembly
200, 300 Glass Substrate
410 Peripheral Wall
420 Partition
421 Partition (First Partition)
422 Partition (Second Partition)
423 End
424 Side Portion
425 Swollen Portion
426 Protrusion
500 Internal Space
511 Evacuation Space
520 Ventilation Space
600 Air Passage
700 Evacuation Port
M20 Material

The invention claimed is:

1. A glass panel unit assembly comprising:
a pair of glass substrates arranged to face each other;
a peripheral wall having a frame shape and disposed between the pair of glass substrates;
a partition arranged to partition an internal space, surrounded with the pair of glass substrates and the peripheral wall, into an evacuation space and a ventilation space;
an evacuation port connecting the ventilation space to an external environment; and
an air passage provided to evacuate the evacuation space through the evacuation port,
an end of the partition facing the peripheral wall with a predetermined gap left between the partition and the peripheral wall,
the air passage being a space between the end of the partition and the peripheral wall,
the partition including, at the end thereof, a swollen portion protruding toward the evacuation space at least along a width of the partition.

2. A glass panel unit assembly comprising:
a pair of glass substrates arranged to face each other;
a peripheral wall having a frame shape and disposed between the pair of glass substrates;
a plurality of partitions arranged to partition an internal space, surrounded with the pair of glass substrates and the peripheral wall, into an evacuation space and a ventilation space;
an evacuation port connecting the ventilation space to an external environment; and
an air passage provided to evacuate the evacuation space through the evacuation port,
the plurality of partitions including a first partition and a second partition, of which lengths are defined in two different directions,
a first end of the second partition facing a side portion of the first partition with a predetermined gap left between the first partition and the second partition,
the air passage being a space between the first end of the second partition and the side portion of the first partition,
the second partition including, at the first end thereof, a swollen portion protruding toward the evacuation space at least along a width of the second partition.

3. The glass panel unit assembly of claim 2, wherein the second partition has a second end, and the swollen portion protrudes toward both the first end and the second end along the width of the second partition.

4. The glass panel unit assembly of claim 3, wherein the swollen portion has a spherical shape.

5. The glass panel unit assembly of claim 3, wherein the swollen portion includes parts obliquely protruding from the end of the second partition toward both the first end and the second end along the width of the second partition.

6. A method for manufacturing a glass panel unit, the method comprising an assembling step, an evacuation step, and a sealing step,
the assembling step including providing the glass panel unit assembly according to claim 1,
the evacuation step including evacuating the evacuation space through the air passage, the ventilation space, and the evacuation port,
the sealing step including deforming the plurality of partitions to close the air passage.

7. The method of claim 6, wherein
the assembling step includes an application step of applying a material for the second partition,
the application step includes forming the swollen portion by making a velocity at which the material is applied along a shorter side of the second partition lower than a velocity at which the material is applied along longer sides of the second partition.

8. The method of claim 6, wherein the sealing step includes deforming the plurality of partitions while evacuating the evacuation space through the air passage, the ventilation space, and the evacuation port.

9. The method of claim 6, further comprising a removing step, wherein the removing step includes removing a part including the ventilation space to obtain a glass panel unit as a part including the evacuation space.

* * * * *